United States Patent
Resnick et al.

(10) Patent No.: US 10,473,687 B1
(45) Date of Patent: Nov. 12, 2019

(54) HIGH SENSITIVITY SINGLE-AXIS MEMS ACCELEROMETER WITH BILATERAL FLEXURES

(71) Applicant: National Technology & Engineering Solutions of Sandia, LLC, Albuquerque, NM (US)

(72) Inventors: Paul J. Resnick, Albuquerque, NM (US); Brian D. Homeijer, Albuquerque, NM (US); Thomas A. Friedmann, Albuquerque, NM (US); Michael Wiwi, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 385 days.

(21) Appl. No.: 15/594,133

(22) Filed: May 12, 2017

(51) Int. Cl.
*G01P 15/125* (2006.01)
*G01P 15/08* (2006.01)

(52) U.S. Cl.
CPC .... *G01P 15/125* (2013.01); *G01P 2015/0837* (2013.01)

(58) Field of Classification Search
CPC ................................................... G01P 15/125
USPC ...................................................... 73/514.32
See application file for complete search history.

(56) References Cited

U.S. PATENT DOCUMENTS

| | | | |
|---|---|---|---|
| 5,551,294 A | 9/1996 | Hermann | |
| 5,652,384 A * | 7/1997 | Henrion | G01P 15/02 73/514.18 |
| 9,238,581 B2 | 1/2016 | Wu et al. | |
| 9,513,310 B2 | 12/2016 | Baldasarre et al. | |
| 2003/0140699 A1 * | 7/2003 | Pike | G01P 15/0802 73/514.32 |

OTHER PUBLICATIONS

Fraux, Romain, "Physical Analysis: Colibrys MS9000 Accelerometer," Version 1, System Plus Consulting, Mar. 2015, 34 pp.
Kamble, Avinash and Khillare, Siddheshwar, "Comparative Study of Different Flexures of MEMS Accelerometers," International Journal of Engineering and Advanced Technology, Feb. 2015, vol. 4, Issue 3, ISSN: 2249-8958, 4 pp.
Serrano, Diego Emilio, "Design and Analysis of MEMS Accelerometers," IEEE Sensors Conference Nov. 4-6, 2013, 45 pp.
Sidek, O., Afif, M. and Miskam, M.A., "Design and Simulation of SOI-MEMS Z-Axis Capacitive Accelerometer," International Journal of Engineering & Technology, Dec. 2010, vol. 10, No. 6, 7 pp.

* cited by examiner

*Primary Examiner* — Justin Seo
*Assistant Examiner* — Rodney T Frank
(74) *Attorney, Agent, or Firm* — Martin L Finston; Mark A. Dodd

(57) ABSTRACT

A microelectromechanical systems (MEMS) accelerometer that has high sensitivity to motion along the z axis is discussed. The device includes two symmetrical sets of bilateral, diametrically opposed high aspect ratio flexures that tether a movable proof mass to the frame of the device. The flexures are designed in such a way as to restrict movement of the proof mass along the x and y axes but readily allow motion along the z axis. More specifically, when the device experiences an acceleration along the x or y axes, the proof mass is restricted from moving because some of the bilateral, diametrically opposed flexures are in compression and others are in tension.

20 Claims, 18 Drawing Sheets

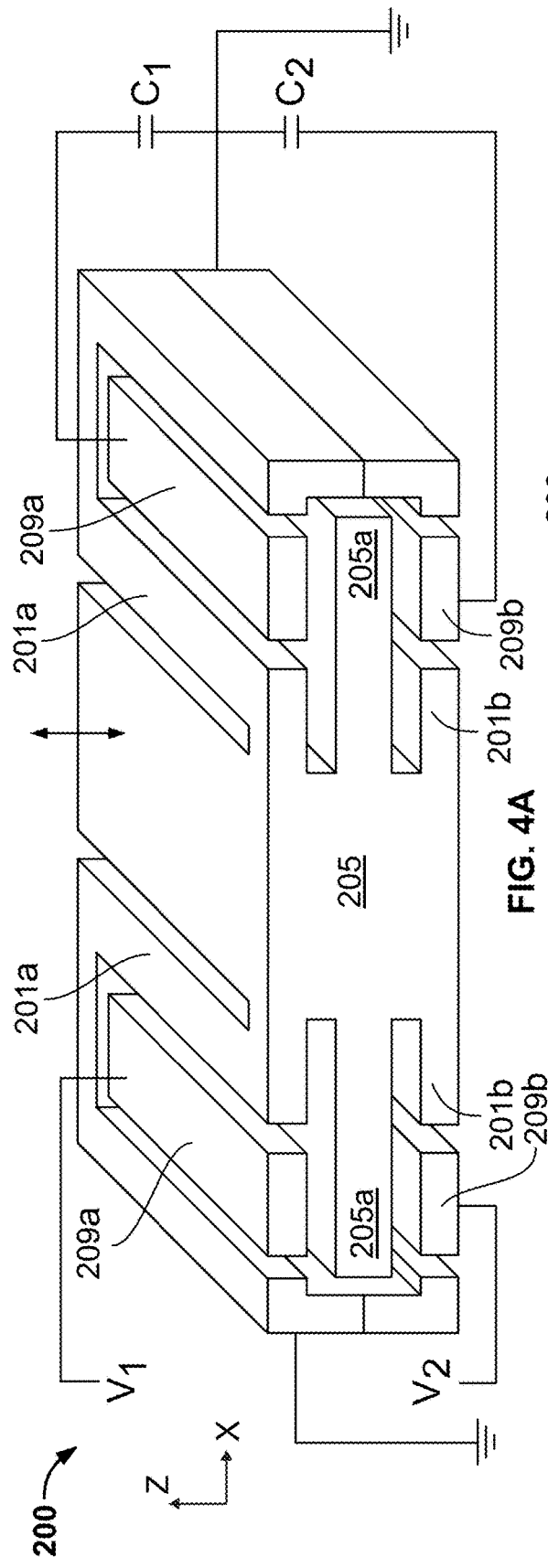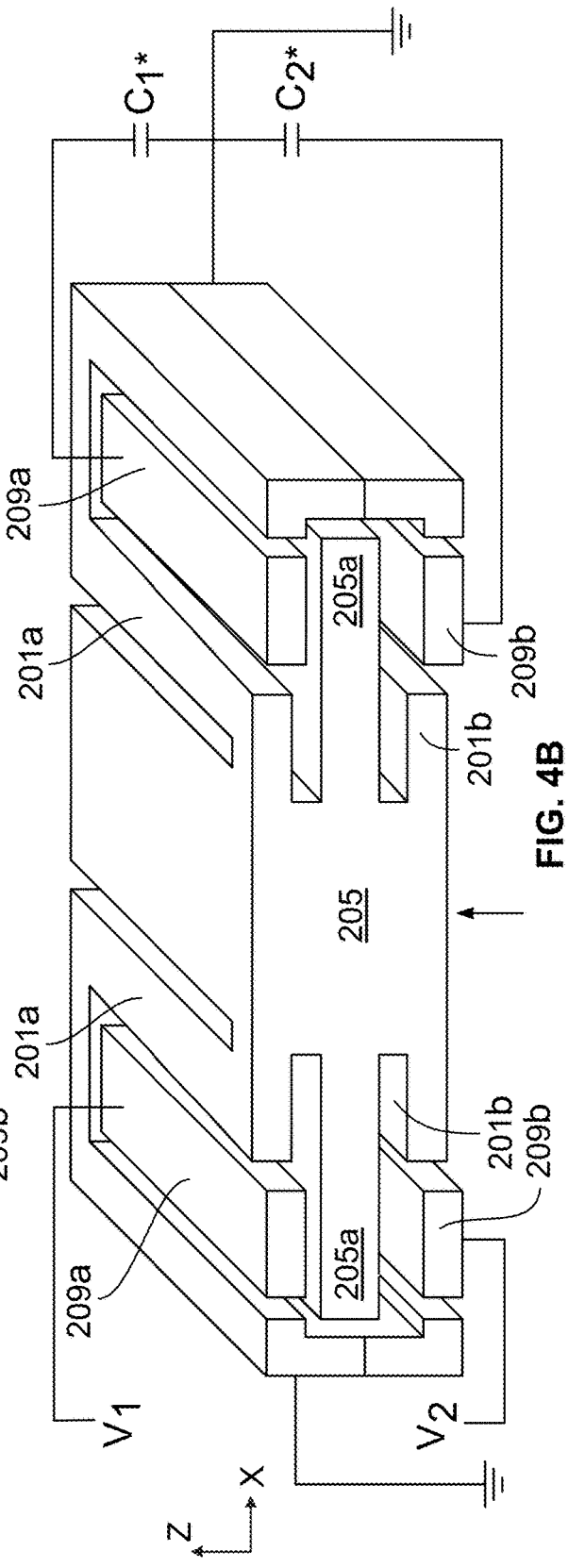

US 10,473,687 B1

HIGH SENSITIVITY SINGLE-AXIS MEMS ACCELEROMETER WITH BILATERAL FLEXURES

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

Aspects of the disclosure relate to a microelectromechanical systems (MEMS) accelerometer that has high sensitivity to out-of-plane (i.e., along the z axis) motion while strongly rejecting in-plane (i.e., along the x and y axes) motion. Other aspects relate to a novel processing scheme for micromachining a high sensitivity single-axis MEMS accelerometer with bilateral flexures.

BACKGROUND

Accelerometers are used to detect motion in one or more directions. MEMS technology has been leveraged to manufacture many different types of sensors and actuators, including accelerometers. For example, these devices have become commercially important to deploy airbags in vehicles. Miniaturization of these devices offers the potential for lower cost, higher throughput, and higher sensitivity.

FIG. 1 illustrates operation of a prior art z-axis MEMS accelerometer 100 at time points 100a and 100b. The prior art system shown in FIG. 1 incorporates a pendulous design in the respect that accelerometer 100 includes a proof mass 102 designed to swing like a pendulum to detect motion. The pendulous motion results from having a proof mass 102 tethered to an anchor 110 via a single flexure 104 in microchannel 108. Electrodes 106a and 106b are situated both above and below proof mass 102 and serve to sense capacitances $C_1$ and $C_2$ and to drive proof mass 102 to a predetermined position along the z axis in microchannel 108, as shown at time point 100a.

Flexure 104 acts as a spring with spring constant k to allow proof mass 102 to move in the +z or −z direction in response to an acceleration experienced by accelerometer 100. For example, if accelerometer 100 experiences an acceleration in the +z direction, proof mass 102 will move in the −z direction. Conversely, if accelerometer 100 experiences an acceleration in the −z direction, proof mass 102 will move in the +z direction.

At time point 100a, proof mass 102 is in its null position (i.e., the position it finds itself in when MEMS accelerometer 100 experiences no acceleration). Proof mass 102 is typically made out of a conductive material and thus, at time point 100a, two capacitors are formed with capacitances $C_1$ and $C_2$ between the proof mass 102 and electrodes 106a, 106b, respectively. At time point 100b, accelerometer 100 has experienced an acceleration in the −z direction, thereby causing proof mass 102 to swing up in the +z direction. Due to displacement of proof mass 102 at time 100b, capacitances $C_1$ and $C_2$ have changed in value. In this particular scenario, capacitance $C_1$ has increased to $C_{1*}$ and capacitance $C_2$ has decreased to $C_{2*}$.

Acceleration experienced by prior art accelerometer 100 is detected through a differential capacitance measurement. In particular, at time point 100a, this differential capacitance measurement is $C_1-C_2$, and at time point 100b, $C_{1*}-C_{2*}$. This change in differential capacitance is sensed through electronics connected to MEMS accelerometer 100.

Prior art pendulous MEMS accelerometer designs, such as the one shown in FIG. 1, can be operated with both open loop and closed loop control. In open loop operation, accelerometer 100 senses a differential capacitance change due to passive displacement of proof mass 102. In closed loop operation, a voltage applied at electrodes 106a, 106b is used to drive proof mass 102 to a "null position" in microchannel 108 (e.g., the center of channel 108 along the z axis), thereby acting as an "electrical spring" superimposed on the mechanical flexure or spring 104. Any external acceleration experienced by device 100 then causes proof mass 102 to move away from its null position and upon detection of this displacement by electrodes 106a, 106b, the applied voltage is adjusted to bring proof mass 102 back to its null position.

The sensor signal in pendulous designs, such as the differential capacitance signal in the design shown in FIG. 1, is ideally insensitive to cross-axis acceleration, i.e., to acceleration orthogonal to the axis of flexure. This is difficult to achieve in practice, however. In FIG. 1, for example, movement of proof mass 102 purely in the x direction will not generate a sensor signal when the center of mass of proof mass 102 is located at z=0. In this instance, flexure 104 will be in tension or compression for acceleration in the x or −x direction. However, if the center of mass of proof mass 102 is displaced from z=0, a cross-axis acceleration (i.e., x or y acceleration) will cause rotation that is sensed by system 100, giving rise to a sensor signal. Thus, the differential capacitance measurement $C_1-C_2$ would change even though proof mass 102 was not experiencing acceleration along the z axis (i.e., the direction for which it was designed to detect acceleration).

Moreover, mechanical springs are much more susceptible than electrical springs to environmental changes such as temperature variations. The response of prior art MEMS accelerometer systems can be significantly affected by the undesirable mechanical properties of flexures 104. More specifically, when operating device 100 in closed loop mode, drive electrodes 106a, 106b pull proof mass 102 back to its null position, but the free body diagram for proof mass 102 along the z axis will be a summation of the mechanical forces due to the mechanical spring along the z axis (i.e., flexure 104) and the electrostatic forces due to the voltage applied between drive electrodes 106a, 106b. Because the mechanical properties of flexure 104 can play a significant role in the mechanical response of proof mass 102, prior art accelerometers 100 can also suffer from significant stability issues with respect to environmental changes such as temperature variations.

BRIEF SUMMARY

The following presents a simplified summary of the disclosure in order to provide a basic understanding of some aspects. It is not intended to identify key or critical elements or to delineate the scope of the invention. The following summary merely presents some concepts of the disclosure in a simplified form as a prelude to the more detailed description provided below.

In an illustrative aspect of the disclosure, a microelectromechanical systems (MEMS) accelerometer that has high sensitivity to out-of-plane motion is disclosed. The non-pendulous design is highly sensitive to motion along the z-axis while strongly rejecting both in-plane and out-of-plane rotational motion.

In another illustrative embodiment, a MEMS accelerometer device is selectively operable in either open loop or closed loop mode. Either electrostatic or electromagnetic force feedback is used in closed loop operation.

In yet another illustrative embodiment, a method of manufacturing a high sensitivity single-axis MEMS accelerometer with bilateral flexures is disclosed. In one non-limiting example, this device is manufactured by bonding together two wafers that have been similarly processed using micromachining techniques.

Of course, the systems, devices, and methods of the above-referenced embodiments may also include other additional elements or steps. In this regard, other illustrative embodiments are disclosed and claimed herein as well.

The details of these and other embodiments are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 4A shows a cross-sectional view of a MEMS accelerometer device with a proof mass in its null position in accordance with at least one aspect of the present disclosure.

FIG. 4B shows a cross-sectional view of a MEMS accelerometer device with a proof mass in a raised position in accordance with at least one aspect of the present disclosure.

DETAILED DESCRIPTION

Figure 1:
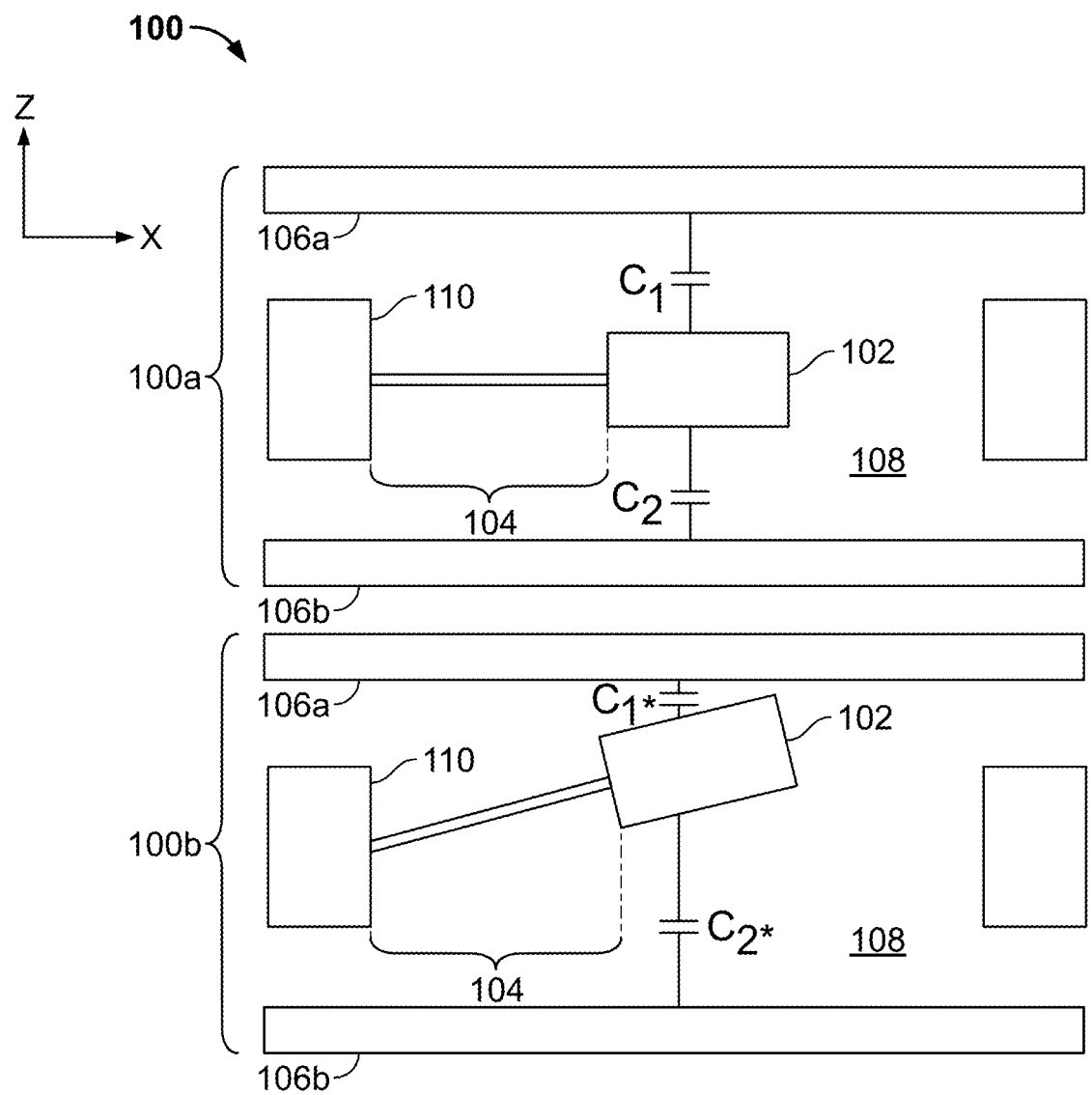
FIG. 1 illustrates the operation of a prior art z-axis MEMS accelerometer at various time points in accordance with various aspects of the disclosure.
Figure 2A:
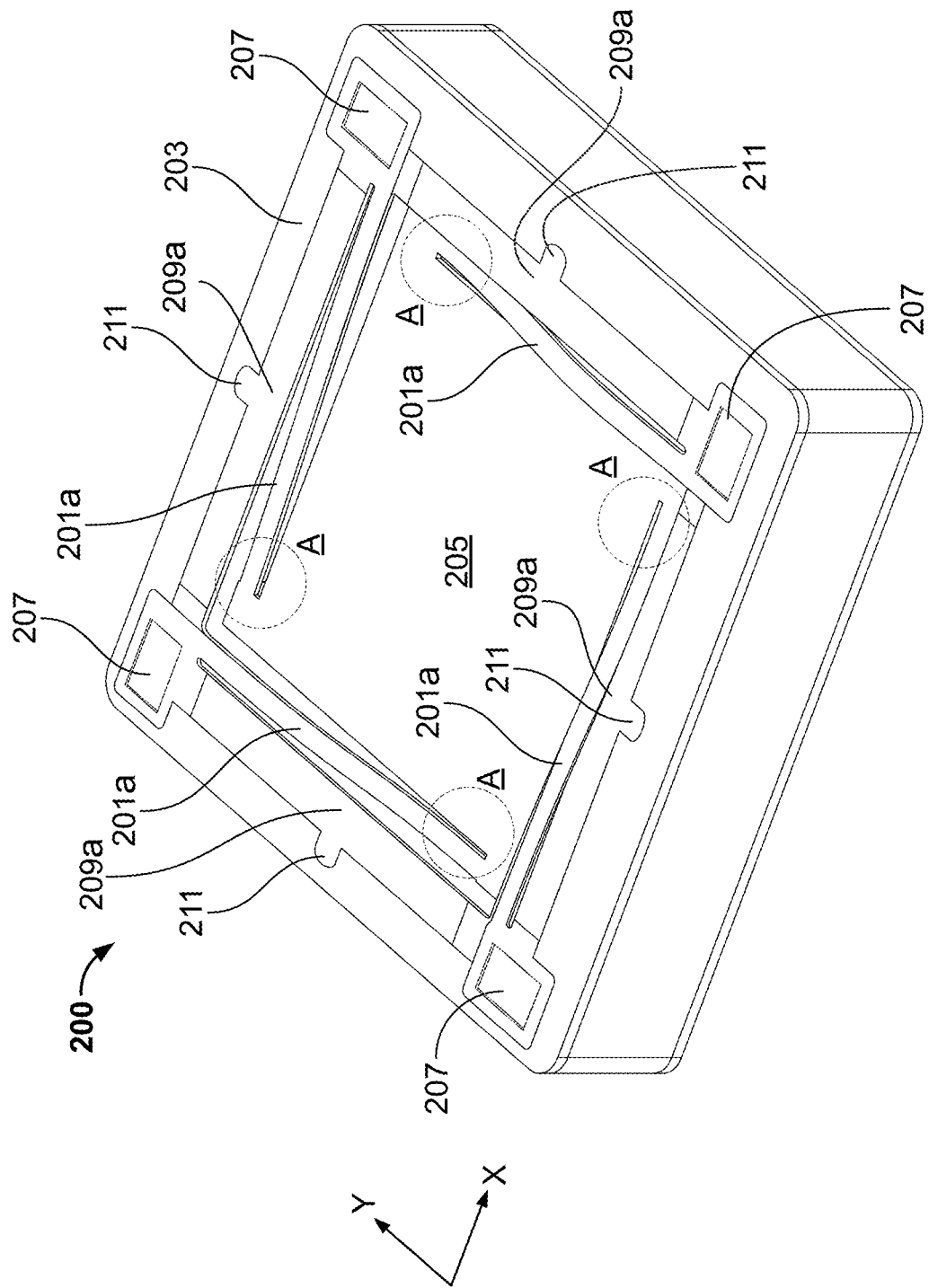
FIG. 2A shows a perspective view of an illustrative embodiment of a MEMS accelerometer device with bilateral flexures in accordance with at least one aspect of the present disclosure.
Figure 2B:
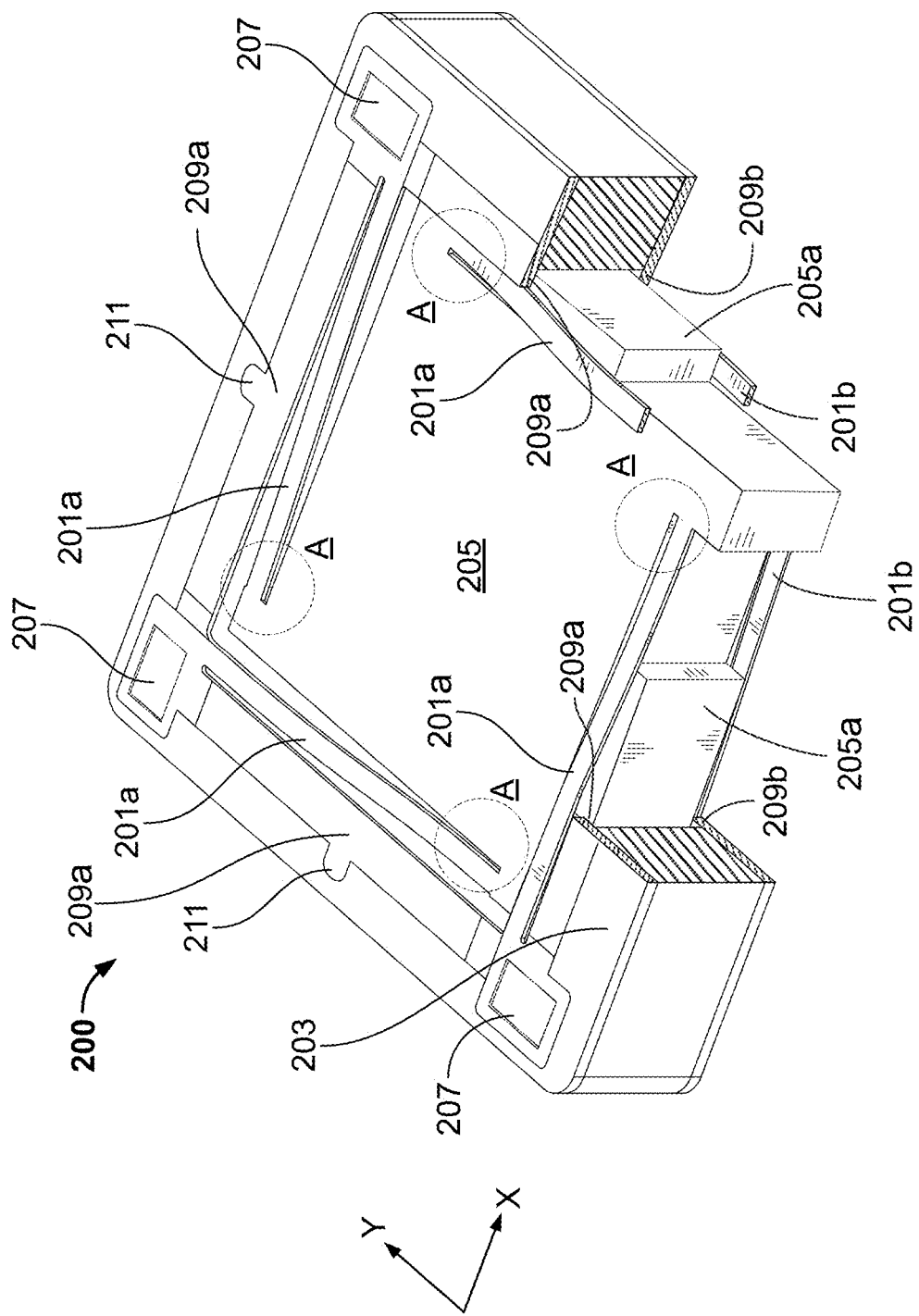
FIG. 2B shows a first cutaway view of an illustrative embodiment of a MEMS accelerometer device with bilateral flexures in accordance with at least one aspect of the present disclosure.
Figure 3A:
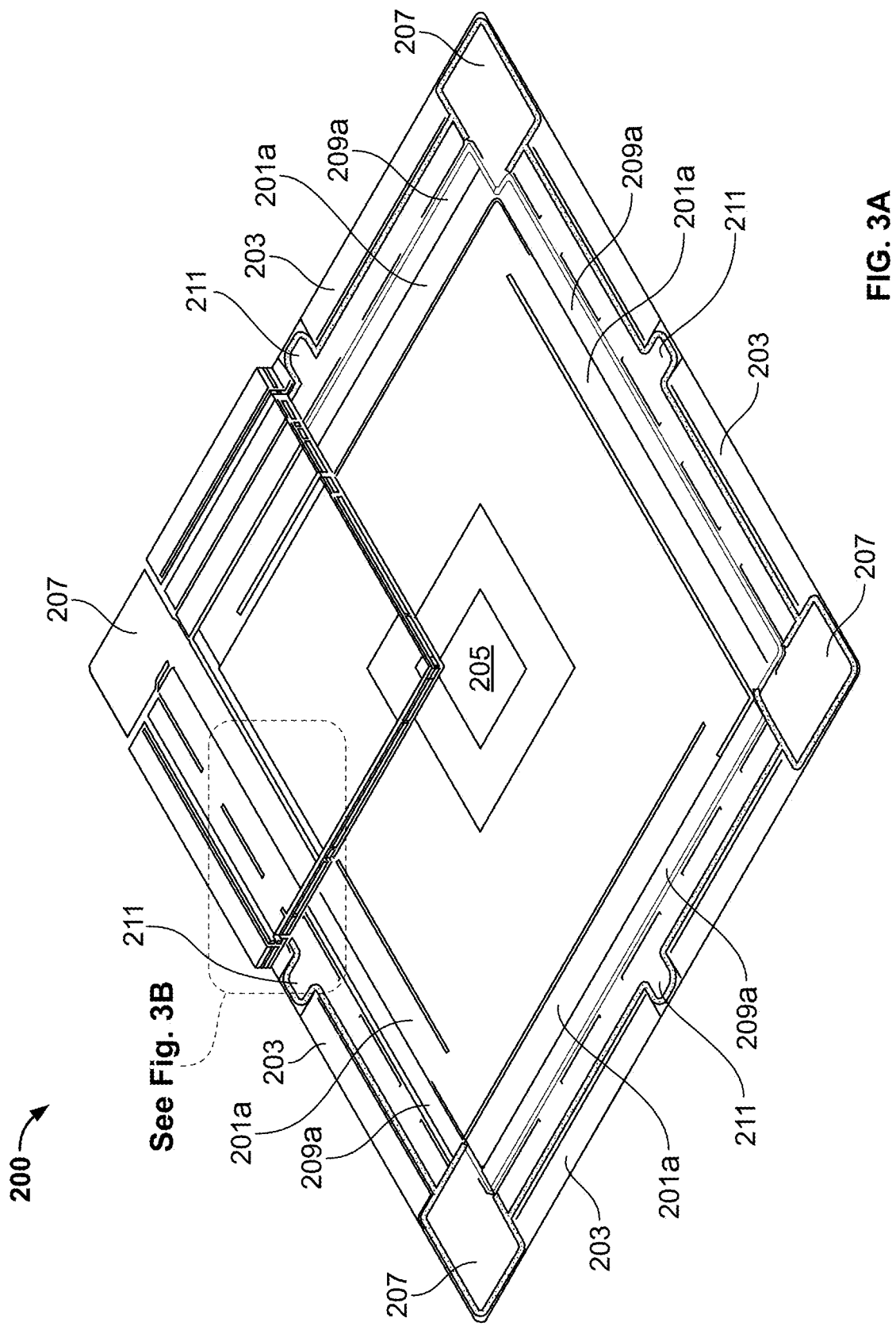
FIG. 3A shows a plan view of an illustrative embodiment of a MEMS accelerometer device with bilateral flexures in accordance with at least one aspect of the present disclosure.
Figure 3B:
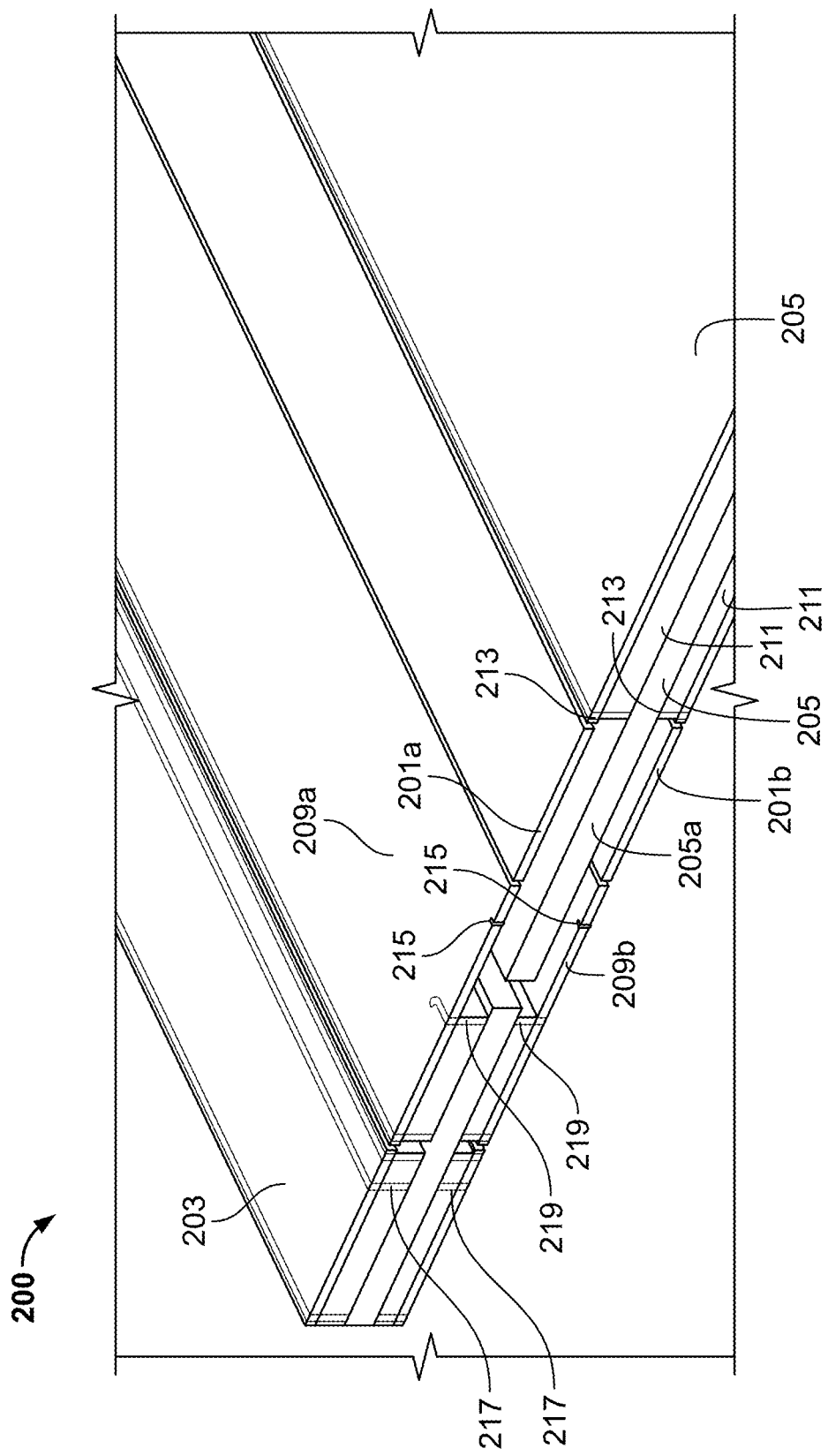
FIG. 3B shows a zoomed-in view of the circled area in FIG. 3A in accordance with at least one aspect of the present disclosure.

FIG. 2A shows a perspective view and FIG. 2B shows a first cutaway view, of an illustrative embodiment of a MEMS accelerometer device 200 with bilateral flexures 201a-b in accordance with at least one aspect of the present disclosure. FIG. 3A shows a plan view of an illustrative embodiment of a MEMS accelerometer device 200 with bilateral flexures 201a-b, and FIG. 3B shows zoomed-in view of the circled area in FIG. 3A in accordance with at least one aspect of the present disclosure.

Device 200 further includes a frame 203 and proof mass 205. Flexures 201a-b are mechanical springs that tether proof mass 205 to frame 203. In particular, flexures 201a-b connect to proof mass 205 at the ends labeled "A" in FIG. 2B and are anchored to frame 203 of device 200 at the opposite end. In FIG. 2B, flexures 201a are seen to bend from a higher elevation at the end where flexures 201a meet frame 203 to a lower elevation at the opposite ends labeled "A" where flexures 201a meet proof mass 205, because in the figure view, proof mass 205 is resting against its bottom surface (not shown). (That is, FIG. 2B represents device 200 at rest in the Earth's gravitational field. Therefore, proof mass 205 is seen resting on its bottom surface.)

Device 200 incorporates a non-pendulous design because proof mass 205 does not swing like a pendulum to detect motion. Rather, because proof mass 205 is surrounded on all four sides by flexures 201a-b, proof mass 205 is designed to move along the z-axis and is restrained from moving along the x and y axes.

The length (typically several thousand micrometers) and width (typically several hundred micrometers) of flexures 201a-b are much greater than the thickness (typically 25-50 μm) of flexures 201a-b. In other words, high aspect ratio flexures 201a-b have a much higher spring constant k along the x and y axes as compared to the z axis. Moreover, device 200 incorporates diametrically opposed flexures 201a-b with symmetry above and below proof mass 205. In this context, flexures 201a are considered to be symmetrical with respect to flexures 201b because the top half of device 200 with flexures 201a is a mirror image of the bottom half of device 200 with flexures 201b.

When proof mass 205 tries to move along the x or y axes (i.e., due to the inertia of the proof mass in an accelerating reference frame), flexures 201a-b are each placed in either tension or compression and suppress such motion. Meanwhile, because flexures 201a-b have a low spring constant k along the z axis, proof mass 205 moves readily in response to acceleration along the z axis. Moreover, in addition to suppressing off-axis motion, the design of device 200, which includes the tethering of proof mass 205 on all four sides with flexures 201a-b, suppresses unwanted torsional motion of proof mass 205.

Device 200 senses acceleration along the z axis through a differential capacitance measurement. In particular, proof mass 205 functions as a movable capacitor plate. Fixed drive and sense electrodes 209a-b both above and below portion 205a of proof mass 205 function as opposing fixed capacitor plates. In one non-limiting embodiment, electrical connections to proof mass 205 are routed through flexures 201a-b to bond pads 207. Areas 207 further serve as anchor points for flexures 201a-b to device frame 203. As portion 205a of proof mass 205 moves along the z axis in response to an acceleration in that direction, the differential capacitance between the two capacitors (one below and another one above portion 205a of proof mass 205) changes.

As further explained below, fixed drive and sense electrodes 209a-b (including topside electrodes 209a and underside electrodes 209b) can be contacted at contact points 211 for connections to a device package. The underside of device 200 includes a symmetrical set of four flexures 201b, bond pads 207, and drive and sense electrodes 209b. In one non-limiting example, eight capacitors are formed in device 200 between fixed electrodes 209a-b and proof mass 205, with four of the capacitors formed on the top side of device 200 and the remaining four capacitors formed on the bottom side of device 200.

Device 200 can be operated in both closed and open loop modes. Moreover, as further explained below, device 200 is amenable to established methods of interrogation and feedback. In open loop mode, a passive differential capacitance measurement is made. That is, the difference in capacitance is measured between (1) the capacitance due to a capacitor formed between portion 205a of proof mass 205 and upper fixed electrode 209a and (2) the capacitance due to a symmetrically positioned capacitor formed between portion 205a of proof mass 205 and lower fixed electrode 209b.

Although device 200 can be characterized, tested, and operated in open loop mode, device 200 is generally designed to be operated in closed loop mode. In closed loop mode, a voltage source is used to apply a voltage to certain of electrodes 209a-b to drive portion 205a of proof mass 205 to a null position in the center of device 200. When device 200 experiences a z-directional acceleration after portion 205a of proof mass 205 reaches this null position, another electrode pair from electrodes 209a-b can be used as sense electrodes 209a-b to make the differential capacitance measurement. This measurement can be tied to the magnitude of the z-directional acceleration experienced by device 200. In some aspects, the signal from sense electrodes 209a-b can be fed through a pre-amplifier prior to measurement. In one implementation, the same pair of electrodes 209a-b can be multiplexed as both sense and drive electrodes.

Further, upon determination by sense electrodes 209a-b of an imbalance in the position of proof mass 205 from the known voltage applied to drive electrodes 209a-b and from the capacitance sensed between sense electrodes 209a-b, the voltage applied to drive electrodes 209a-b is changed to bring portion 205a of proof mass 205 back to its null position. In one implementation, once sense electrodes 209a-b sense an imbalance in the position of proof mass 205, the imbalance is fed through a feedback control loop (e.g., a PID control loop), and this feedback loop determines a new voltage to apply to drive electrodes 209a-b to bring portion 205a of proof mass 205 back to its null position. Generally, opposing pairs of electrodes 209a-b are chosen to maintain proof mass 205 in its null position or to drive proof mass 205 back to its null position to ensure that a force is being applied purely in the z direction and to avoid applying a torque to proof mass 205. In one non-limiting embodiment, direct current voltages up to 20 volts are applied between opposing electrodes 209a-b to drive the proof mass to its null position. In other non-limiting embodiments, direct current voltages greater than 20 volts can be applied between opposing electrodes 209a-b, provided catastrophic breakdown is not reached.

In lieu of a voltage driver, an electromagnetic coil attached to the top of proof mass 205 with a corresponding magnetic yoke can be used to drive portion 205a of proof mass 205 to the center of device 200. In this scenario, all of electrodes 209a-b are used as sense electrodes 209a-b and the electromagnetic coil structure is used to create a z-directional force on proof mass 205. In one implementation, currents up to 20 milliamps are applied to the coil structure to force proof mass 205 to its null position.

In one non-limiting example, four of the electrodes 209a-b on device 200 are arranged as a first and a second differential pair for sensing capacitance and the other four of the electrodes 209a-b are arranged as a first and a second differential pair for driving proof mass 205 to its null position or for keeping proof mass 205 at its null position.

FIG. 3B shows additional detail for a pair of flexures 201a-b and electrodes 209a-b in device 200 for the area circled in FIG. 3A. More specifically, FIG. 3B shows an upper flexure 201a, lower flexure 201b, upper fixed electrode 209a, and lower fixed electrode 209b. Between electrodes 209a-b, a portion 205a of proof mass 205 juts out into the cavity formed by electrodes 209a-b, flexures 201a-b, insulating layers 211, and frame 203. Portion 205a of proof mass 205 functions as the movable capacitor plate. Portion 205a moves in response to an external acceleration experienced by device 200. In addition, portion 205a can be driven to a predetermined location by the application of voltages (relative to ground) to upper fixed electrode 209a and to lower fixed electrode 209b. Moreover, insulating layers 211 (e.g., silicon dioxide) serve to electrically isolate various layers of device 200, and bump stops 215 serve to minimize stiction between electrodes 209a-b and portions 205a of proof mass 205.

FIG. 4A shows a cross-sectional view of MEMS accelerometer device 200 with a proof mass 205 in its null position in accordance with at least one aspect of the present disclosure. FIG. 4A shows more clearly how a portion 205a of proof mass 205 extends between sense and drive electrodes 209a-b. Portion 205a is centered between drive electrodes 209a-b because voltages $V_1$ and $V_2$ have been applied to cause portion 205a to levitate at this null position.

FIG. 4B shows a cross-sectional view of MEMS accelerometer device 200 with a proof mass 205 in a raised position in accordance with at least one aspect of the present disclosure. Portion 205a of proof mass 205 is no longer centered between drive electrodes 209a-b because an external acceleration in the −z direction has caused portion 205a to move in the +z direction. Moreover, flexures 201a-b have bent upward in response to this external acceleration. Accordingly, sense electrodes 209a-b sense that capacitances $C_1$ and $C_2$ have changed to $C_{1*}$ and $C_{2*}$ in response to displacement of proof mass 205. Voltages $V_1$ and $V_2$ will also subsequently be adjusted to bring portion 205a back to its null position.

One of the keys to operation of device 200 is the presence of extremely compliant flexures 201a-b. As noted, application of a voltage to drive electrodes 209a-b can drive proof mass 205 toward the center of device 200. When drive voltages 209a-b are turned off, however, the weight of proof mass 205 will cause flexures 201a-b to bend downward along the z axis and will bring portion 205a of proof mass 205 to rest on an electrode 209b patterned on a surface below portion 205a.

Because mechanical springs or flexures 201a-b are very thin in their dimension along the z axis, typically only 25-50 µm thick, they are relatively compliant along the z axis. On the other hand, the electrical "spring" that actively supplies a restoring force along the z axis can be made, in operation, much stiffer along the z axis than mechanical springs or flexures 201a-b.

More specifically, the "electrical spring" is a servomechanism with an electromechanical actuator (i.e., the voltage applied to electrodes 209a-b or a coil and magnetic yoke structure as described above) and a negative feedback control loop. The "electrical spring" is stiffer than mechanical springs or flexures 201a-b because the feedback system applies an electromechanical restoring force that is much greater than the purely mechanical restoring force due to the relatively low spring constant of flexures 201a-b along the z axis.

Because flexures 201a-b are so compliant along the z axis, any drift in the mechanical properties of flexures 201a-b (e.g., due to temperature variations) is essentially negligible. Moreover, device 200 performs better than prior art systems because bilateral, diametrically opposed flexures 201a-b restrict cross-axis motion and sensitivity.

FIGS. 2A and 2B show an arrangement in which flexures 201a-b are bilateral and diametrically opposed. The flexure arrangement in FIGS. 2A and 2B is bilateral in the respect that flexures 201a-b restrain the motion of the proof mass along both the x and y axes of device 200. Moreover, the arrangement in FIGS. 2A and 2B includes diametrically opposed flexures. At least one pair of flexures on the top surface of device 200 are considered to be diametrically opposed because they are coplanar and situated on opposite sides of proof mass 205. Likewise, at least one pair of flexures on the bottom surface of device 200 are considered to be diametrically opposed because they are also coplanar and situated on opposite sides of proof mass 205.

In one non-limiting example, device 200 includes two sets of diametrically opposed flexures 201a on the top surface of device 200 and two sets of diametrically opposed flexures 201b on the bottom surface of device 200, as shown in FIGS. 2A and 2B. More generally, bilateral flexures 201a-b can include any flexure arrangement in which flexures 201a-b are present on two sides of device 200. In addition, diametrically opposed flexures 201a-b can include any flexure arrangement in which flexures 201a-b are in opposition to one another.

Figure 5A:
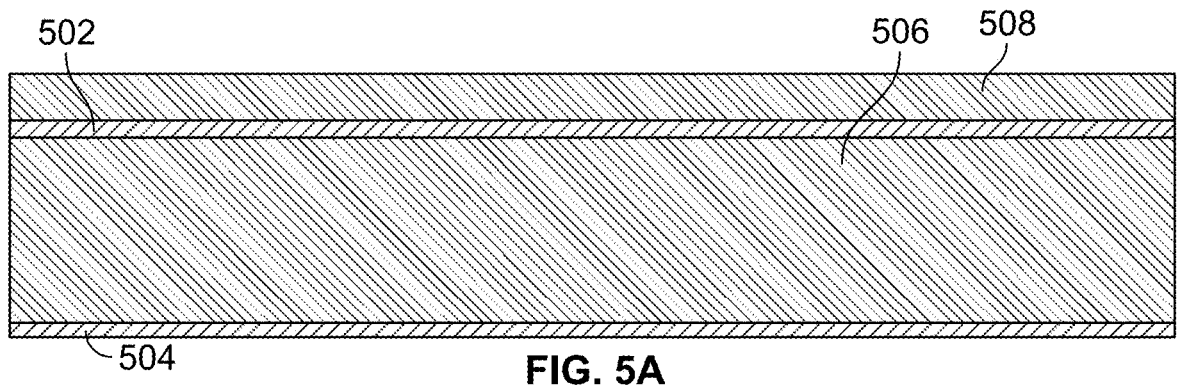
FIGS. 5A-5U illustrate a first process flow for monolithically manufacturing a MEMS accelerometer device with bilateral flexures in accordance with at least one aspect of the present disclosure.
Figure 5B:
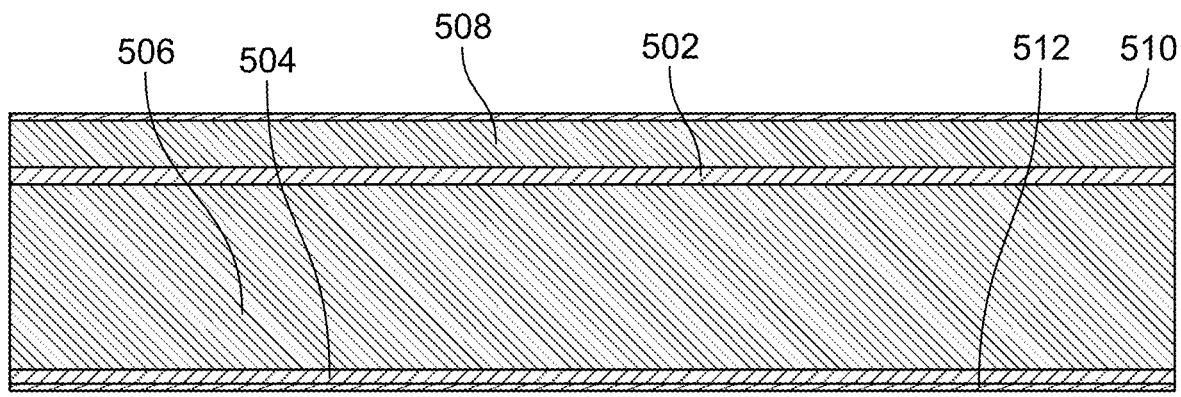
Figure 5C:
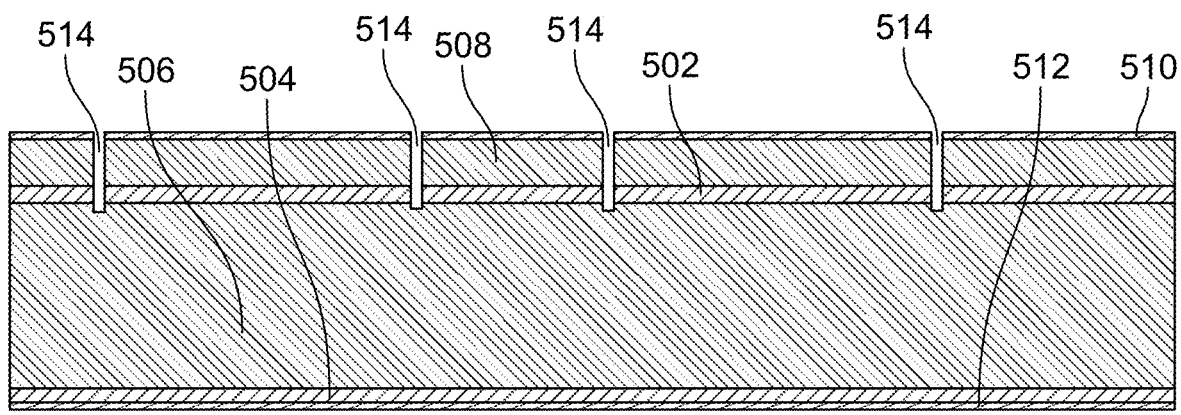
Figure 5D:
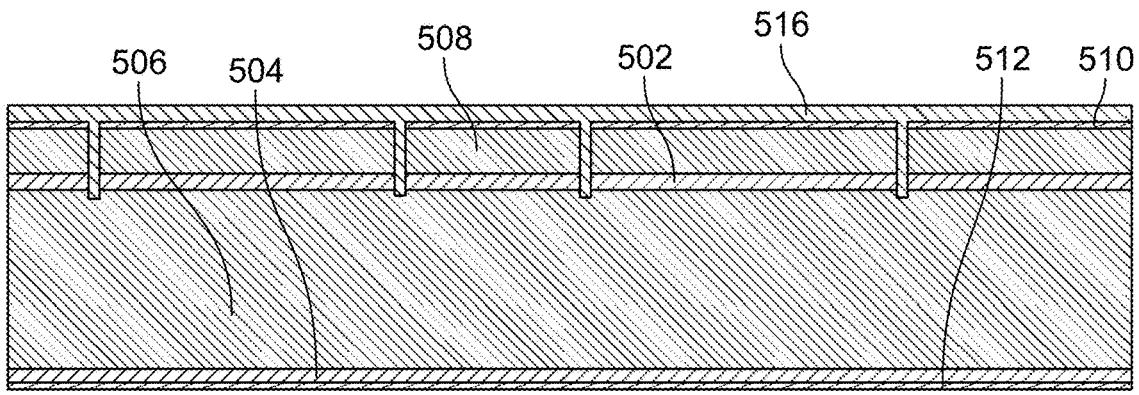
Figure 5E:
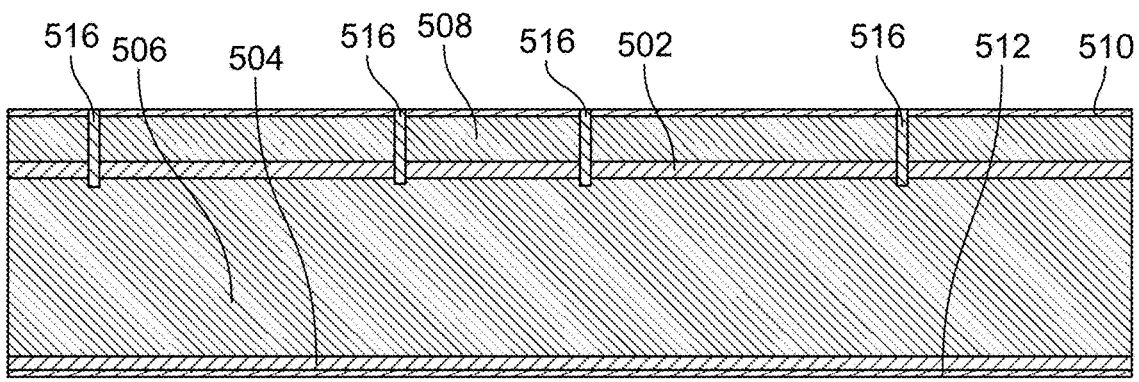
Figure 5F:
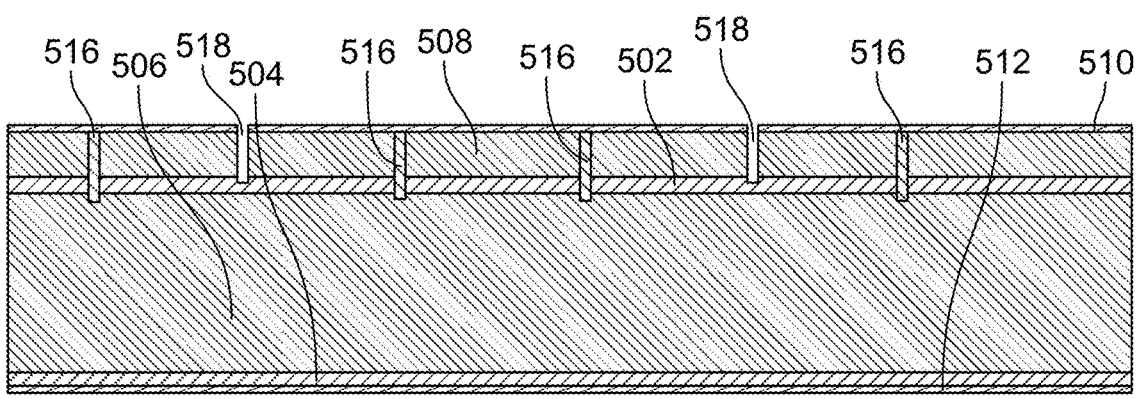
Figure 5G:
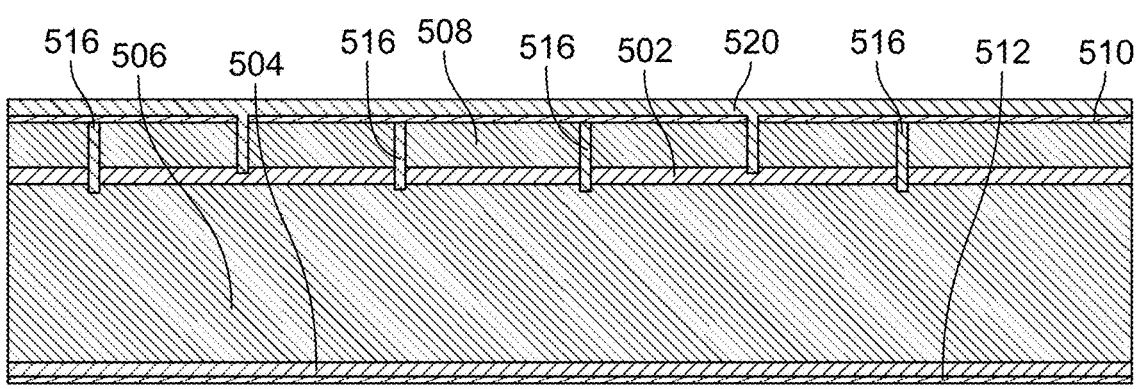
Figure 5H:
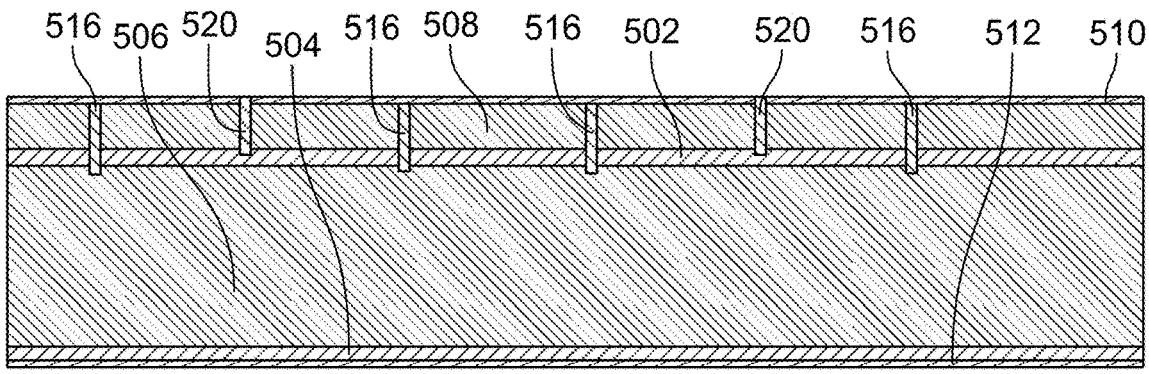
Figure 5I:
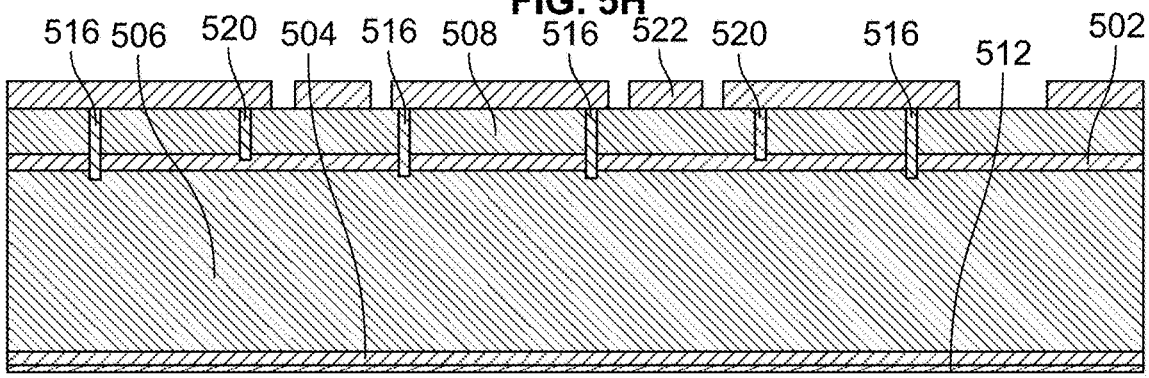
Figure 5J:
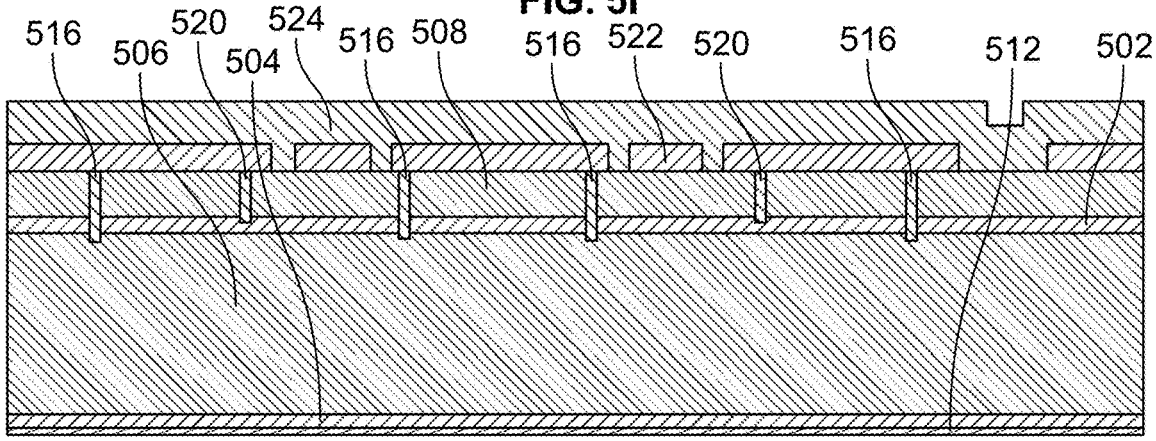
Figure 5K:
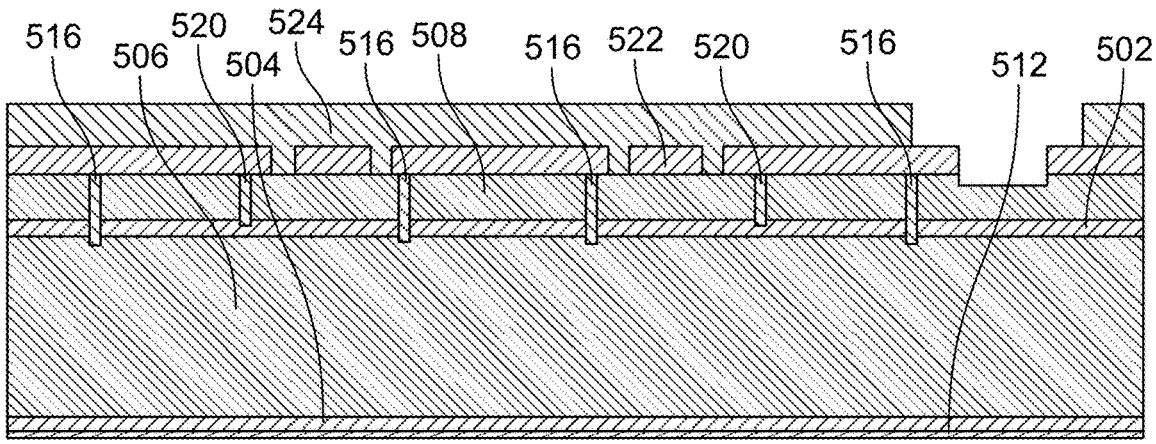
Figure 5L:
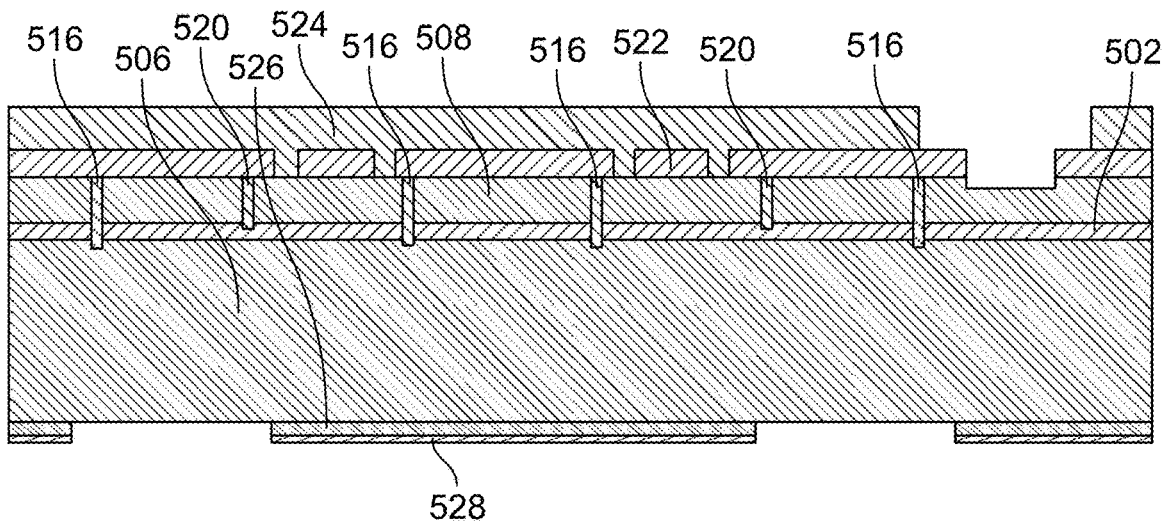
Figure 5M:
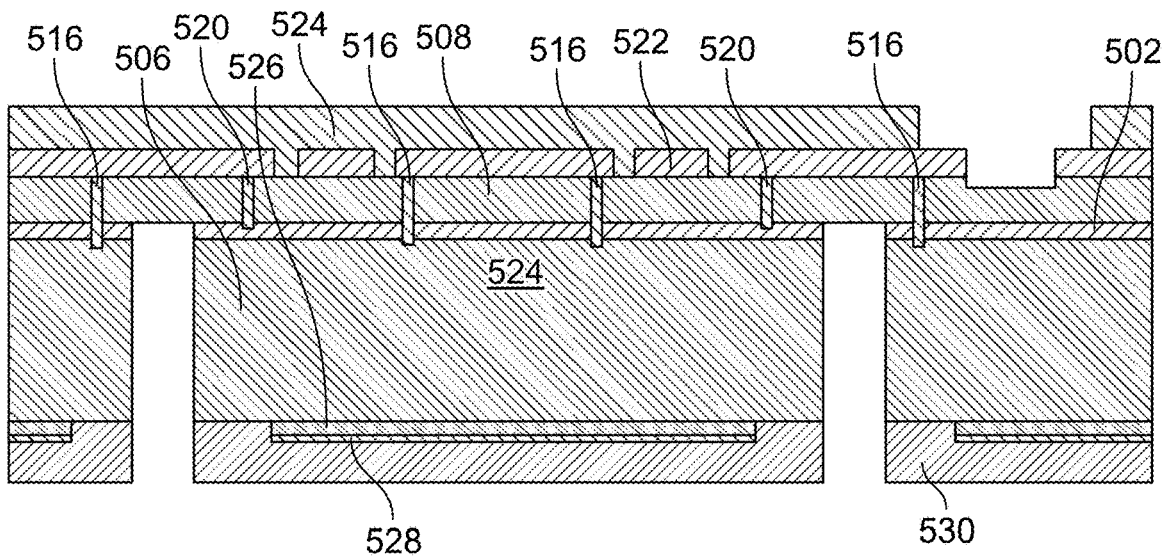
Figure 5N:
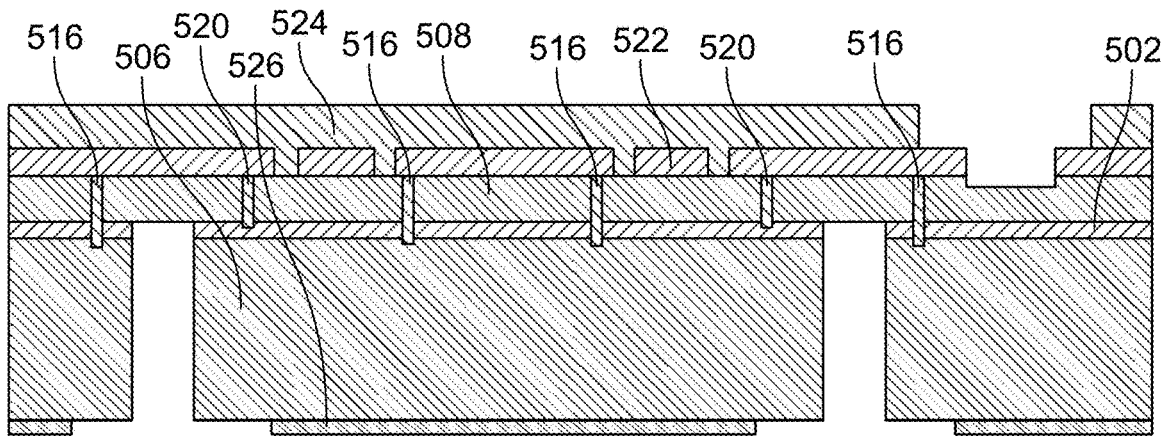
Figure 5O:
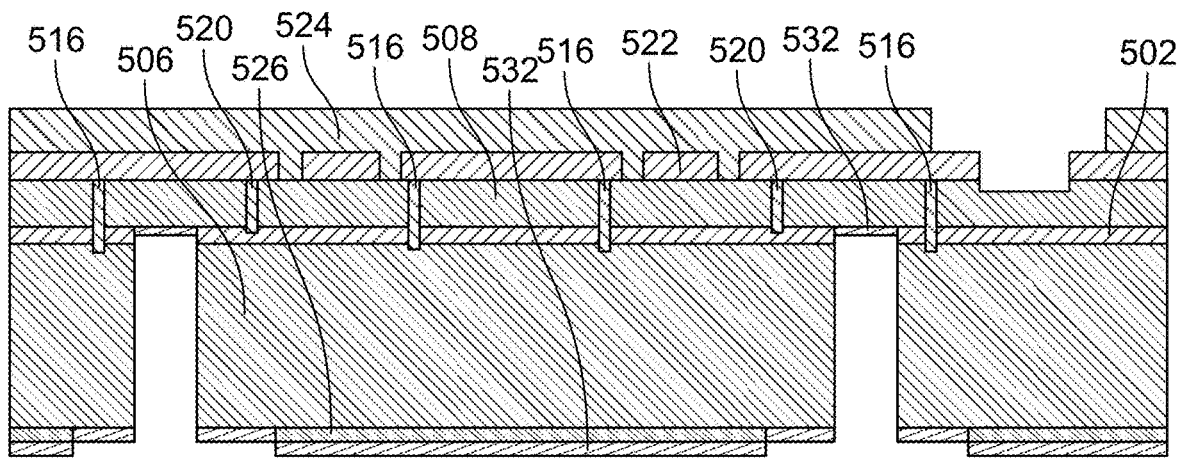
Figure 5P:
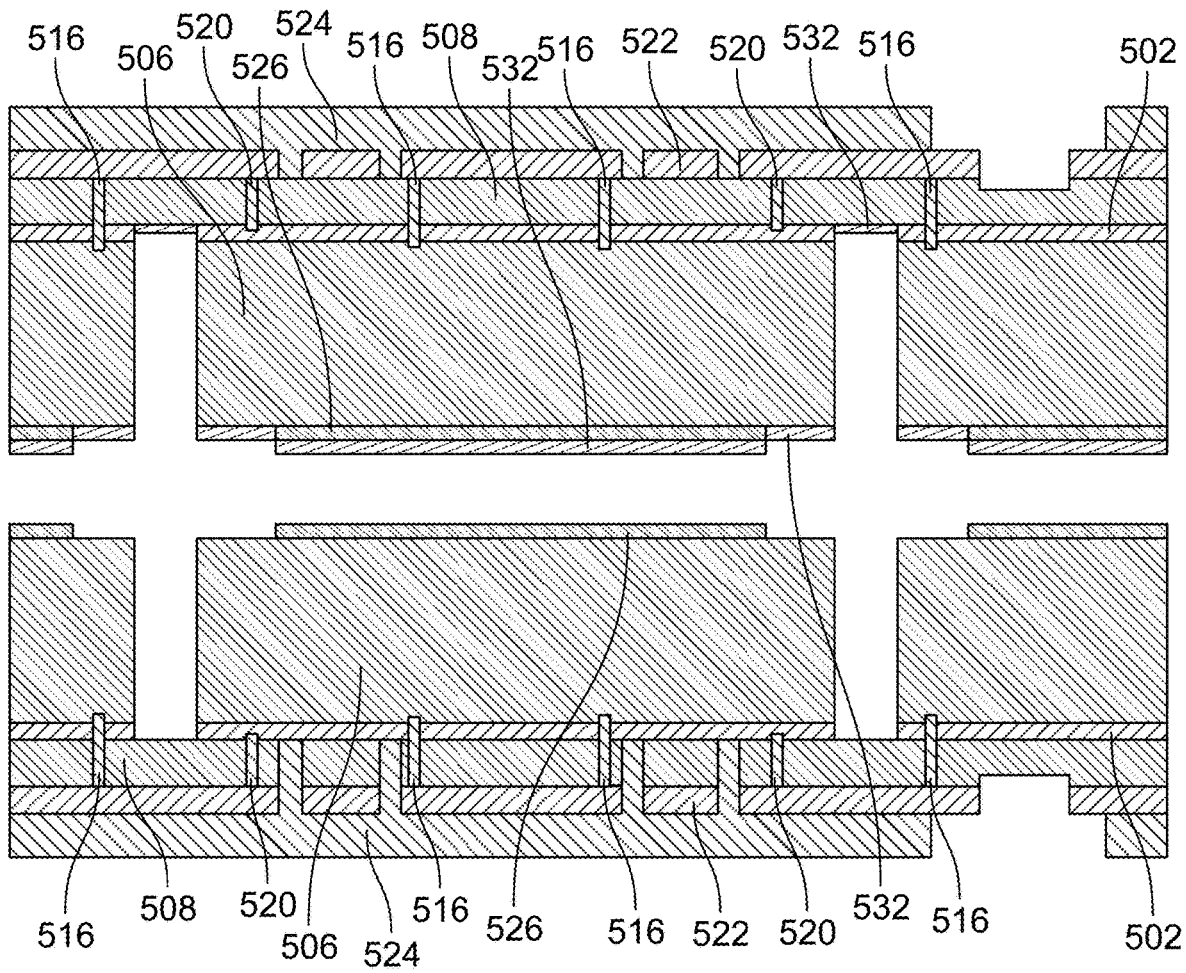
Figure 5Q:
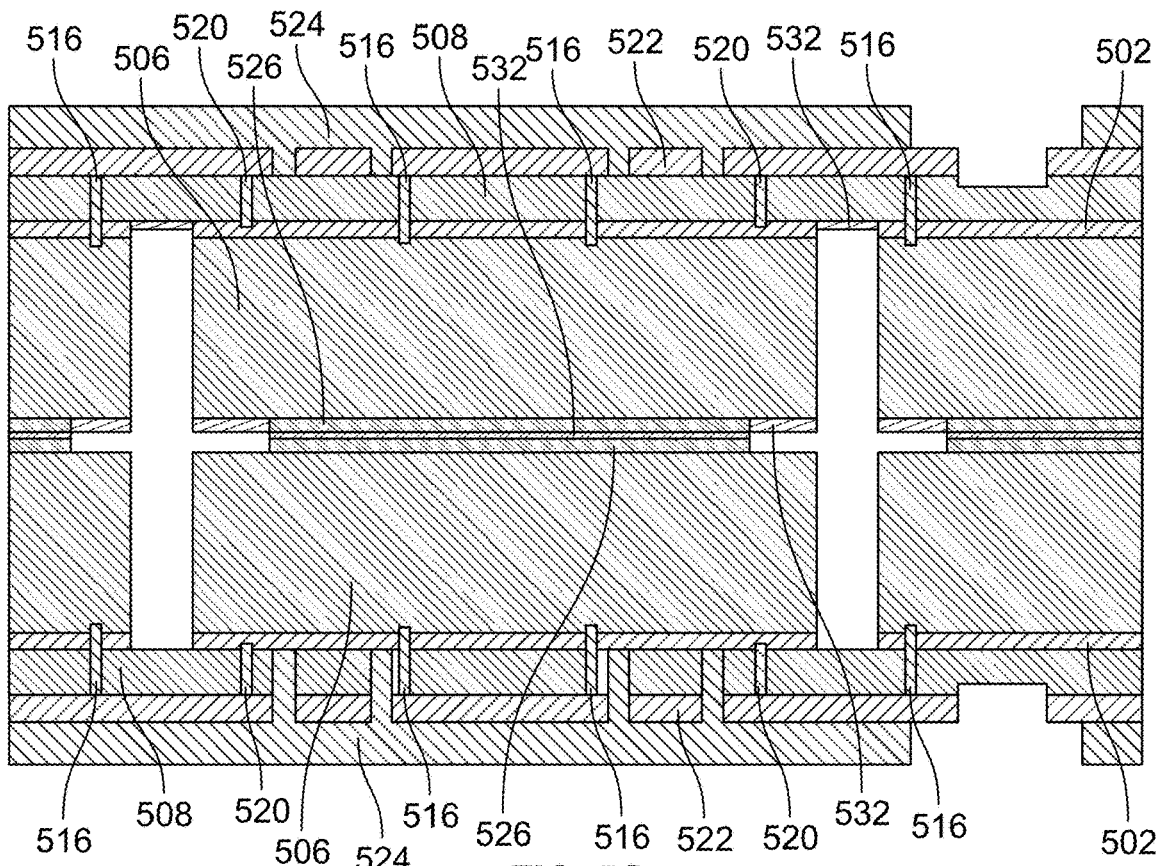
Figure 5R:
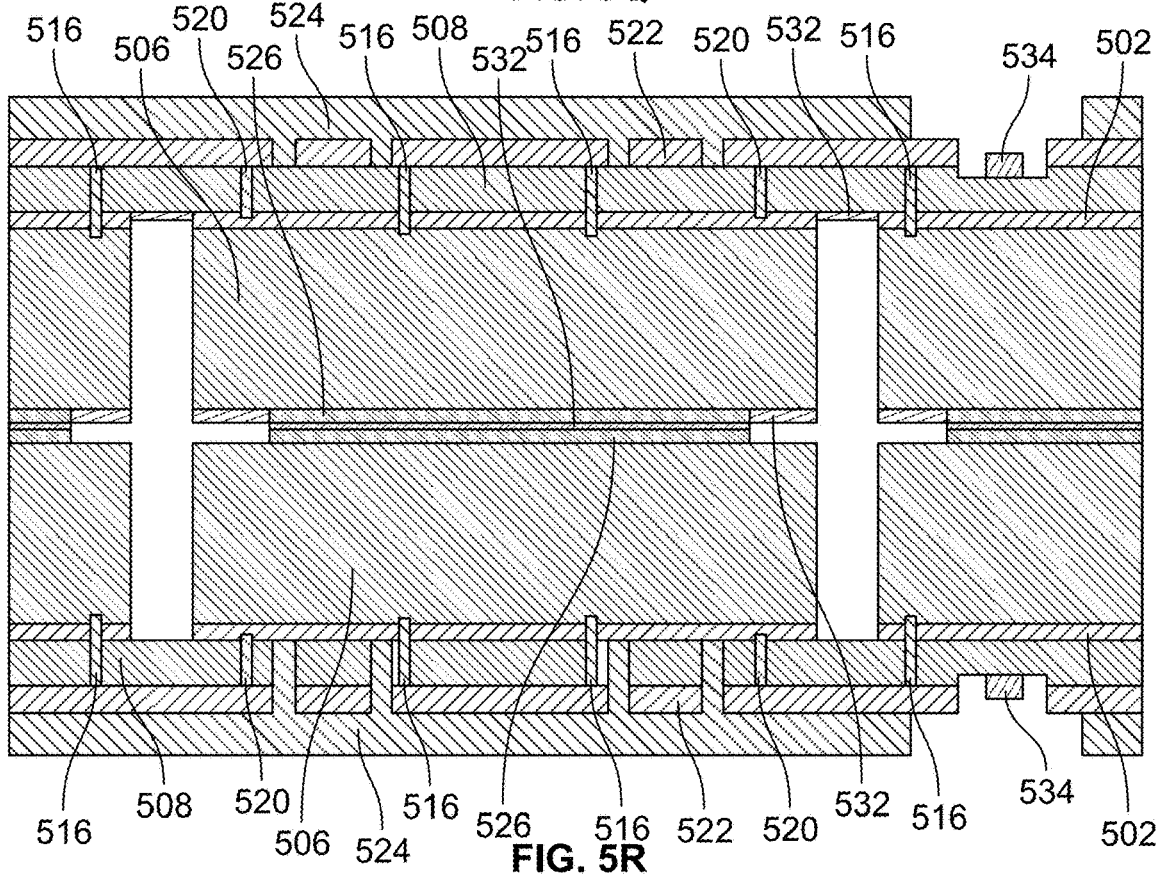
Figure 5S:
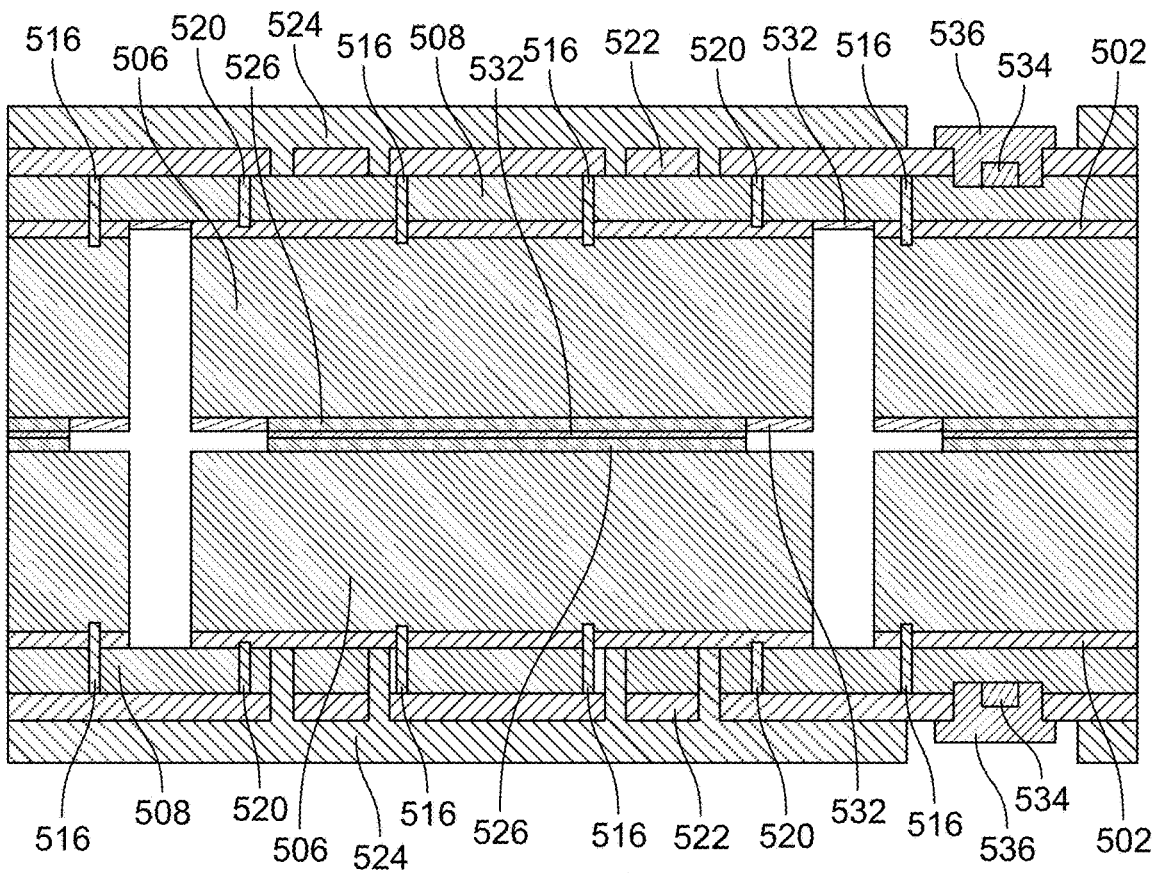
Figure 5T:
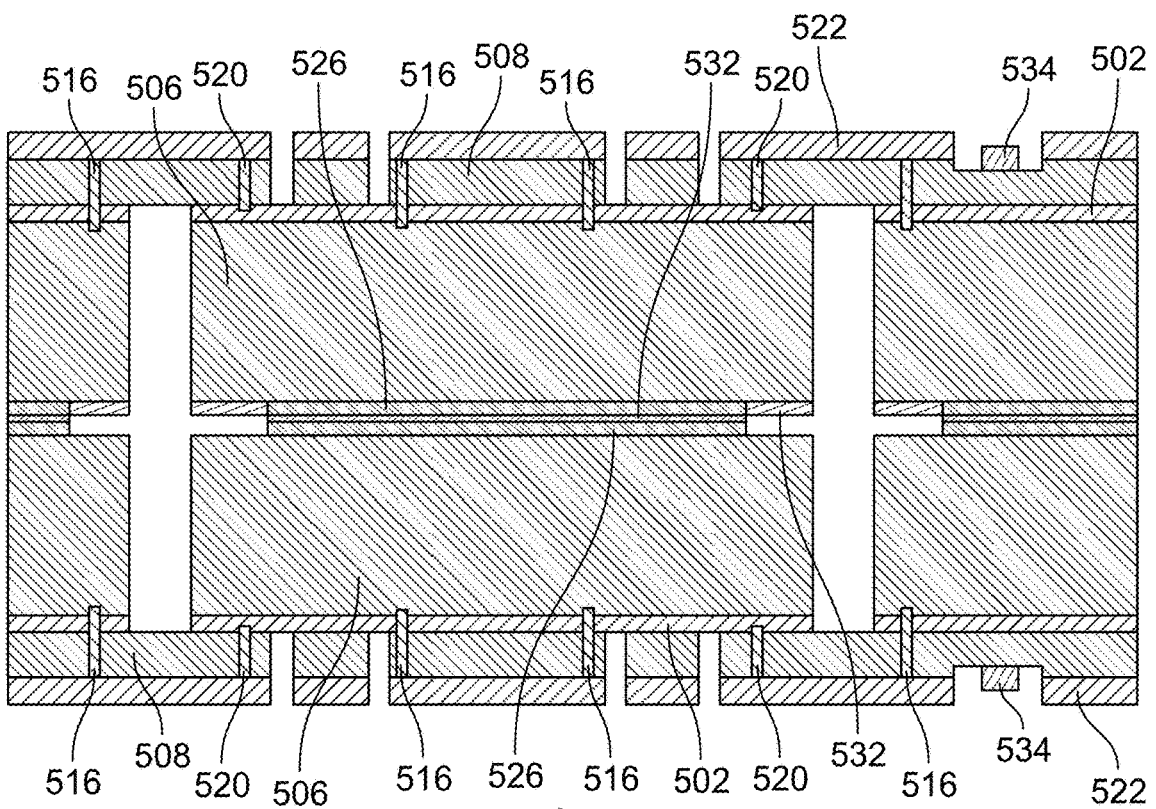
Figure 5U:
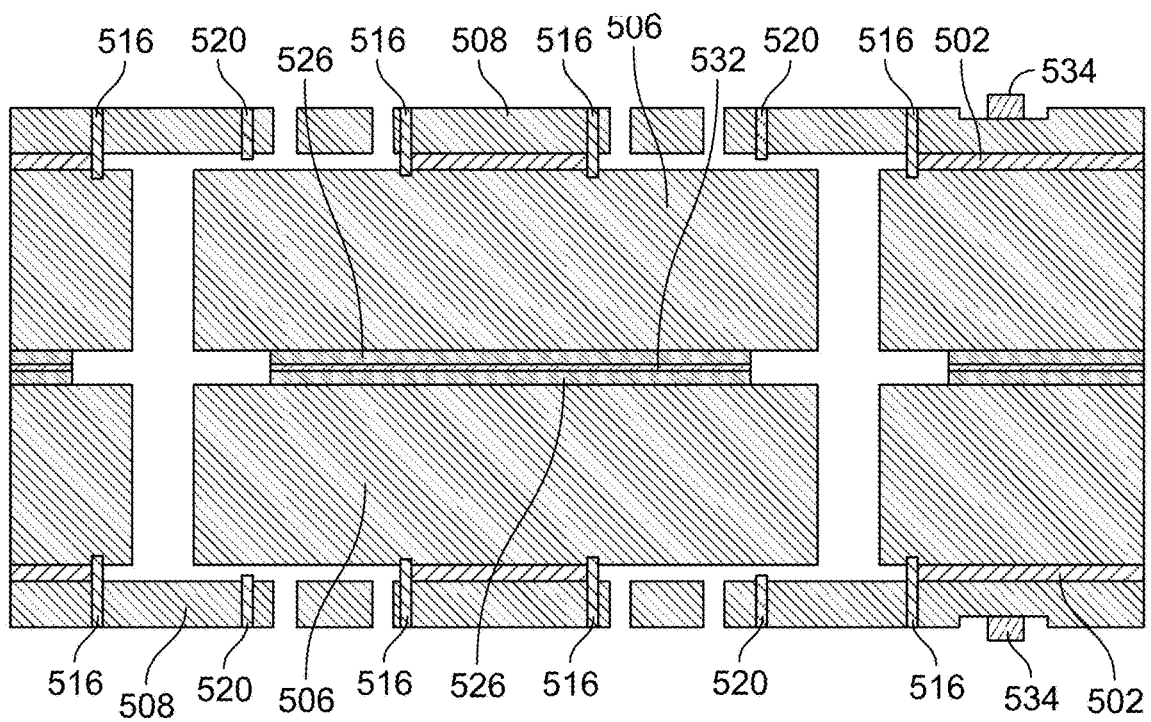

FIGS. 5A-5U illustrate a first process flow for monolithically manufacturing MEMS accelerometer device 200 with bilateral flexures 201 in accordance with at least one aspect of the present disclosure. This exemplary process flow will be described with the use of specific materials, but other materials with similar properties can be used in lieu of those mentioned below. For example, aluminum is mentioned in the description below as an illustrative material for a conductive layer. It should be borne in mind, however, that gold, platinum, doped polysilicon, or other conductive materials may be suitable alternatives.

As shown in FIG. 5A, a silicon on insulator (SOI) wafer with buried silicon dioxide layer 502 and backside silicon dioxide layer 504 is obtained. In one non-limiting example, the buried oxide layer 502 is 1-2 μm thick, the intermediate silicon layer 506 is 600-650 μm thick, and the top silicon layer 508 is 25-50 μm thick. The thickness of the top silicon layer 508 defines the thickness of flexures 201 along the z axis. Next, as shown in FIG. 5B, a low pressure chemical vapor deposition (LPCVD) furnace is used to deposit silicon nitride layers 510 and 512 to serve as chemical mechanical polishing (CMP)-stop layers.

Then, as shown in FIG. 5C, trenches 514 are etched through top silicon layer 508, buried oxide layer 502, and into intermediate silicon layer 506. Some trenches 514 serve as electrical interconnect and others are lined with a dielectric material. For those lined with a dielectric material, a non-conducting material (e.g., undoped polysilicon) is then deposited into trenches 514 using LPCVD and planarized. Both of these types of trenches 514 may serve as lateral etch stops to confine the extent of the subsequent release etch (e.g., using hydrofluoric acid). To serve as a lateral etch stop, the chosen dielectric (e.g., silicon nitride) must have a sufficiently slow etch rate in the release chemistry. To serve as electrical interconnect, trenches 514 are filled with a conductive material (e.g., heavily doped polysilicon). Trenches 514 serve as electrical interconnect (e.g., electrical interconnect 217 in FIG. 3B) for making ground connections in frame 203 or connecting proof mass 205 to bond pads 207 through flexures 201a-b on the surface of manufactured MEMS accelerometer device 200. In other words, trenches 514 serving as electrical interconnection make connections between silicon intermediate layer 506 and top silicon layer 508.

Next, as shown in FIG. 5D, a polysilicon layer 516 is deposited using an LPCVD process to fill trenches 514. To realize a flat top surface with conductive trenches 514, chemical mechanical planarization (CMP) is then used to remove excess polysilicon 516 and stop on silicon nitride layer 510, as shown in FIG. 5E.

Then, as shown in FIG. 5F, bump stop vias 518 are etched through top silicon layer 508 and partially through buried oxide layer 502. Bump stops 518 are used to minimize stiction of proof mass 205 against electrodes 209a-b. To achieve this effect, bump stops 518 generally have a small cross-sectional area (e.g., 4 μm×4 μm) so that proof mass 205 makes contact only in those areas.

Polysilicon 520 is then deposited into vias 518 as shown in FIG. 5G, and CMP is used to planarize the polysilicon layer 520 back down to silicon nitride layer 510 in FIG. 5H.

Next, as shown in FIG. 5I, silicon nitride layer 510 is stripped and a silicon dioxide layer 522 is deposited and patterned. A blanket layer of polysilicon 524 is then deposited for stress compensation and surface protection and any polysilicon deposited on the wafer backside is stripped as shown in FIG. 5J.

Then, as shown in FIG. 5K, polysilicon layer 524 is patterned to expose and etch areas on silicon surface 508 for bond pads used to make electrical contact with proof mass 205 or electrodes 209a-b. In this step, some over-etch into top silicon layer 508 is acceptable.

Next, as shown in FIG. 5L, silicon dioxide layer 504 and the silicon nitride layer 512 are stripped from the wafer backside. Then a conductive layer (e.g., aluminum) 526 and a protective film layer (e.g., titanium nitride) 528 are deposited and patterned on the backside of the wafer. The protective film layer 528 helps to protect conductive layer 526 during the subsequent silicon etching step.

Next, as shown in FIG. 5M, the backside of the silicon wafer is patterned with photoresist layer 530 and intermediate silicon layer 506 is etched (e.g., via a deep reactive ion etch) to define half the thickness of proof mass 205. Next, as shown in FIG. 5N, protective TiN layer 528 and photoresist layer 530 are stripped from the backside. Then a bilayer material 532 (e.g., germanium to create an aluminum germanium bilayer material) is deposited to aid the subsequent eutectic bond, as shown in FIG. 5O.

Next, as shown in FIG. 5P, a second wafer that has undergone the same processing steps detailed above is aligned to the first wafer. Subsequently, the second wafer is bonded to the first wafer using the eutectic bonding method, as shown in FIG. 5Q. Then as shown in FIG. 5R, a conductive layer (e.g., chromium, gold, platinum, etc.) 534 is deposited and patterned on both sides of the bonded device to serve as electrode pads.

Next, as shown in FIG. 5S, a photoresist layer 536 is patterned over conductive layer 534 to protect conductive layer 534 during the subsequent step. Then, as shown in FIG. 5T, polysilicon layer 524 on the top and bottom surface and top silicon layer 508 are etched using DRIE and photoresist layer 536 is then stripped.

Finally, as shown in FIG. 5U, silicon dioxide layers 502 and 522 are stripped using a hydrofluoric acid etch. Moreover, any unreacted germanium in aluminum germanium layer 532 is stripped in hydrogen peroxide. Finally, the device is dried using supercritical carbon dioxide.

Figure 6A:
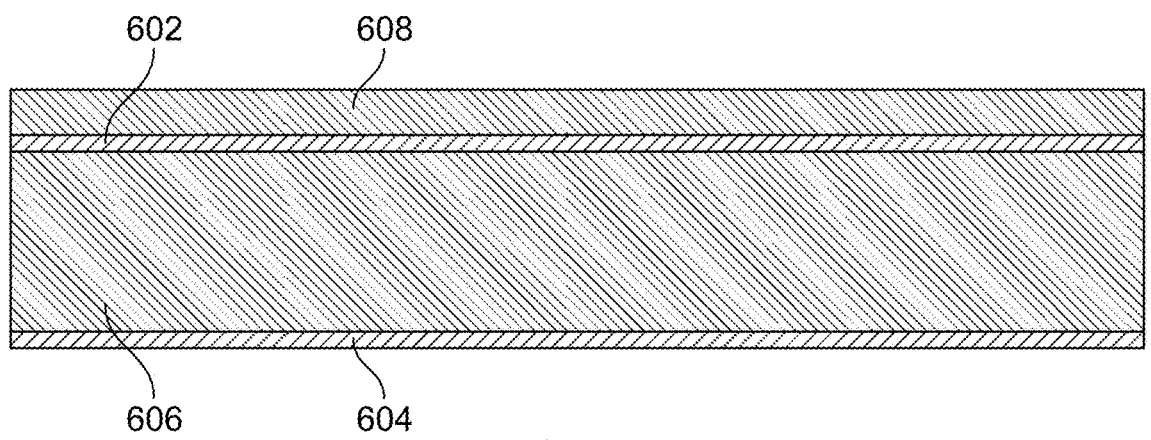
FIGS. 6A-6M illustrate a second process flow for monolithically manufacturing a MEMS accelerometer device with bilateral flexures in accordance with at least one aspect of the present disclosure.
Figure 6B:
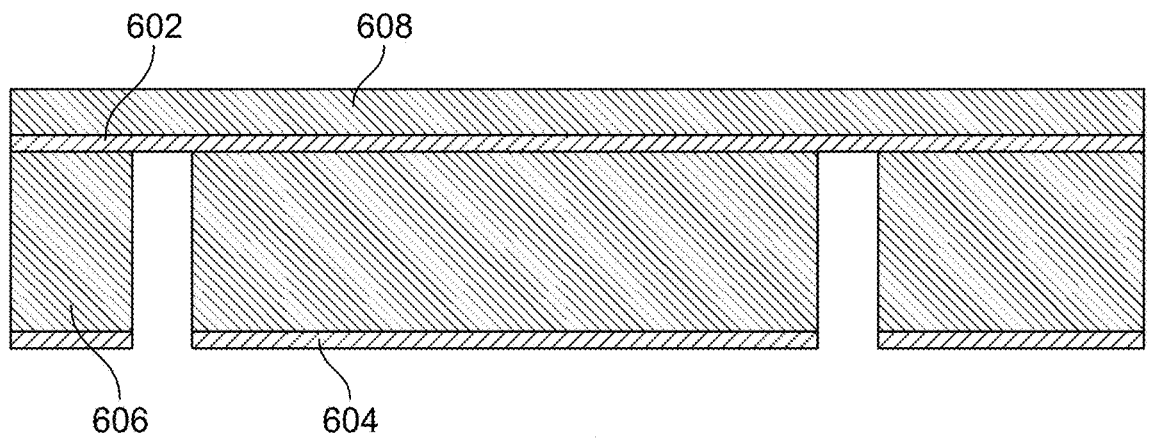

FIGS. 6A-6M illustrate a second process flow for monolithically manufacturing MEMS accelerometer device 200 with bilateral flexures 201 in accordance with at least one aspect of the present disclosure. Similar to the process flow described in FIG. 5, this exemplary process flow will be described with the use of specific materials, but other materials with similar properties can be used in lieu of those mentioned below. As shown in FIG. 6A, a silicon on insulator (SOI) wafer with buried silicon dioxide layer 602, backside silicon dioxide layer 604, intermediate silicon layer 606, and top silicon layer 608 is obtained. Then, as shown in FIG. 6B, silicon dioxide layer 604 on the backside of the wafer is patterned and etched to expose intermediate silicon layer 606 at predetermined locations. Intermediate silicon layer 606 is then etched using DRIE to define proof mass 205 of accelerometer device 200.

Figure 6C:
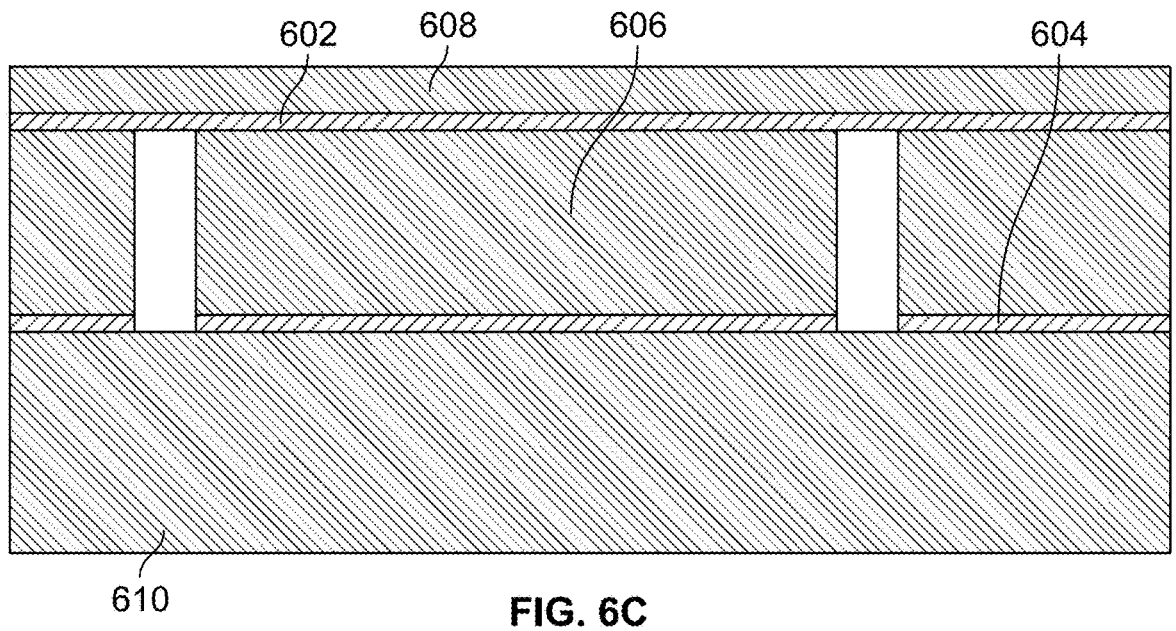
Figure 6D:
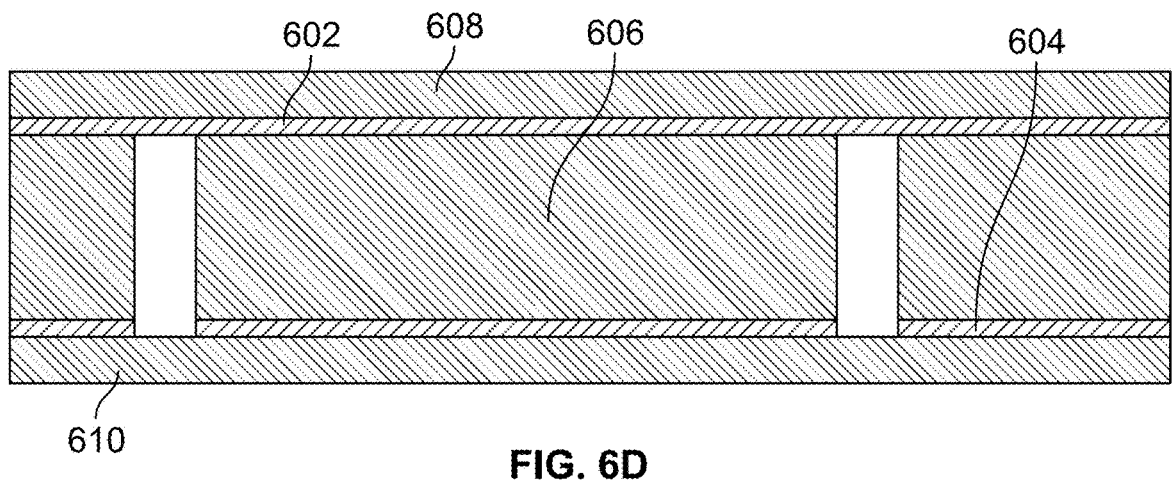

Next, as shown in FIG. 6C, a second silicon wafer 610 is fusion bonded to the backside of the first wafer. Then, as shown in FIG. 6D, wafer 610 is ground and polished to achieve a thickness that is similar to the thickness of top silicon layer 608 in the first wafer.

Figure 6E:
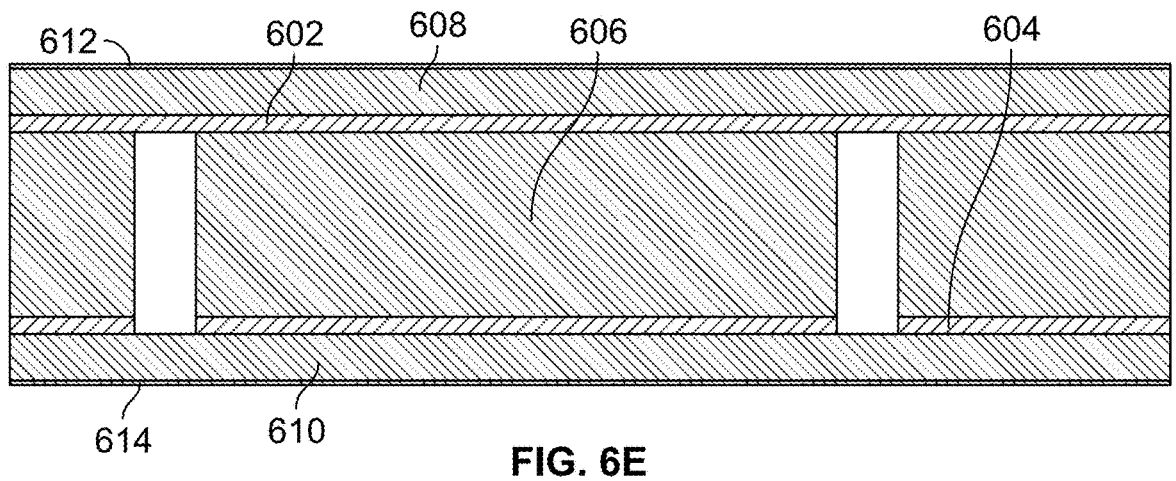
Figure 6F:
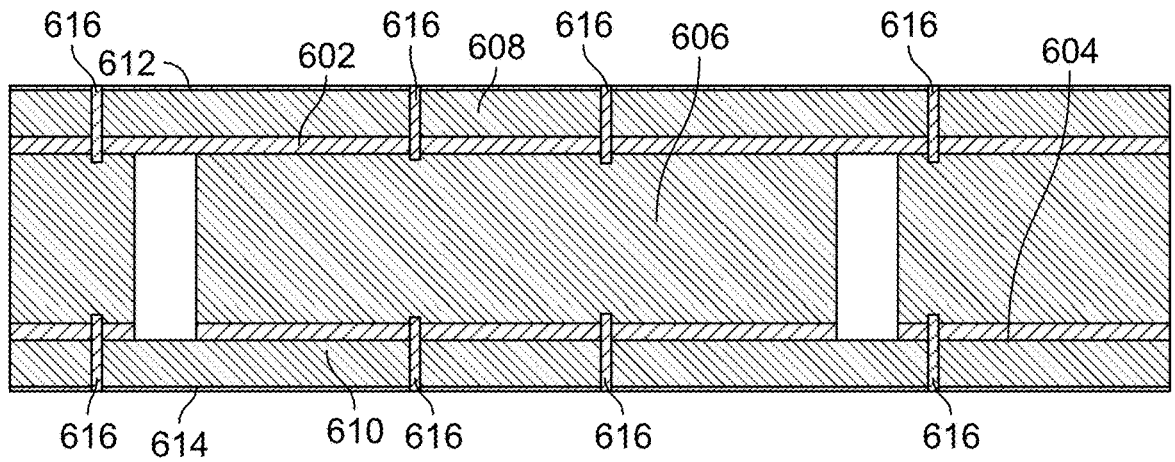

Next, as shown in FIG. 6E, silicon nitride layers 612 and 614 are deposited using an LPCVD process on the top and bottom surfaces to serve as a backstop against which CMP is used to planarize interconnect and etch-stop layers in the subsequent step. Then, as shown in FIG. 6F, trenches 616 that serve as interconnection for routing conductive lines and etch stops (e.g., etch stops 213, 219 in FIG. 3B) for containing the subsequent lateral etch of buried oxide layers 602, 604 are etched on both the front and back side of device 200 through silicon layers 608, 610 and buried oxide layers 602, 604. Trenches 616 function as etch stops and electrical interconnection as explained above for trenches 514 in FIG. 5.

Figure 6G:
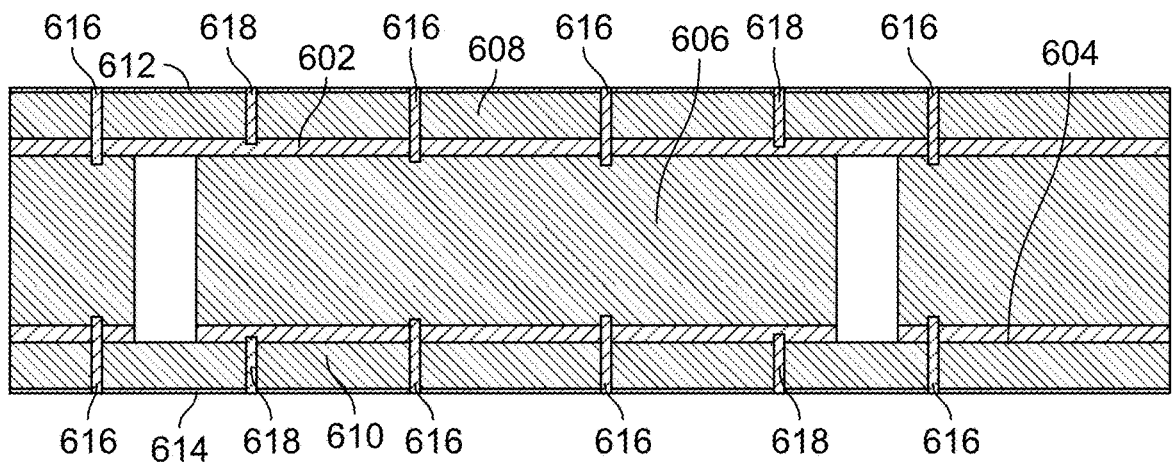

Then, as shown in FIG. 6G, bump stops 618 are etched through top and bottom silicon layers 608, 610. This etch goes partially into buried oxide layers 602, 604. Once trenches 618 are etched, polysilicon is deposited using an LPCVD process and then CMP is used to planarize the surface.

Figure 6H:
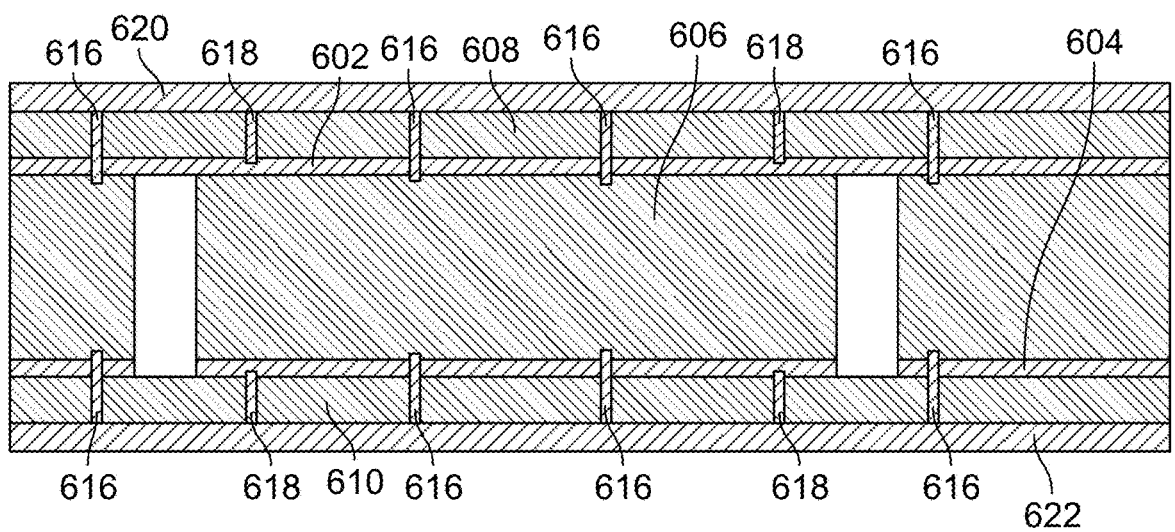
Figure 6I:
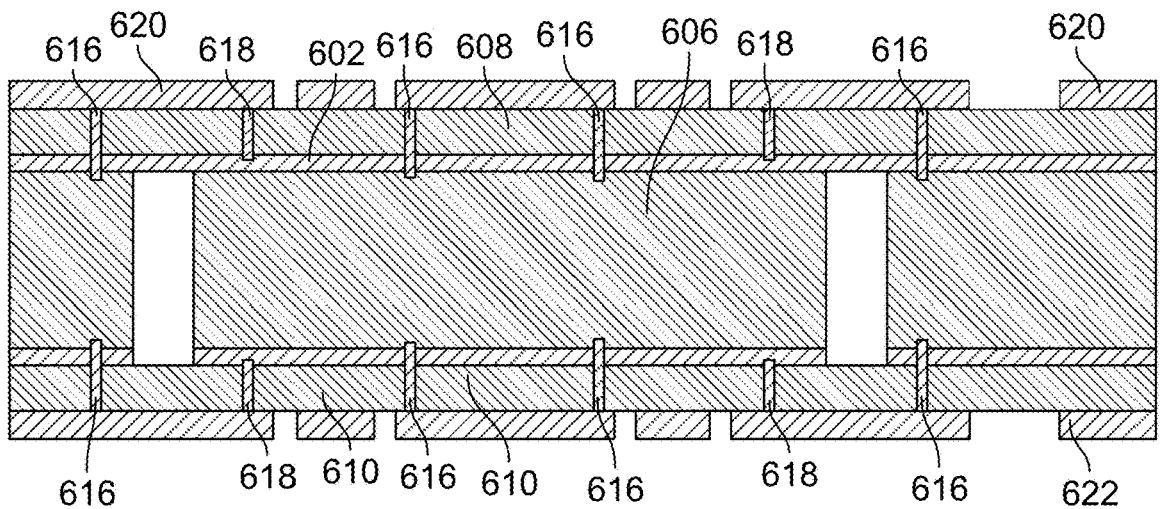

Next, as shown in FIG. 6H, silicon nitride layers 612, 614 are stripped and silicon dioxide layers 620, 622 are deposited on both the front and back side of device 200. Then silicon dioxide layers 620, 622 are patterned and etched to create bond pad openings for electrical connections to various parts of device 200 and to provide a hard mask definition for later patterning of silicon layer 608 via a reactive ion etch, as shown in FIG. 6I.

Figure 6J:
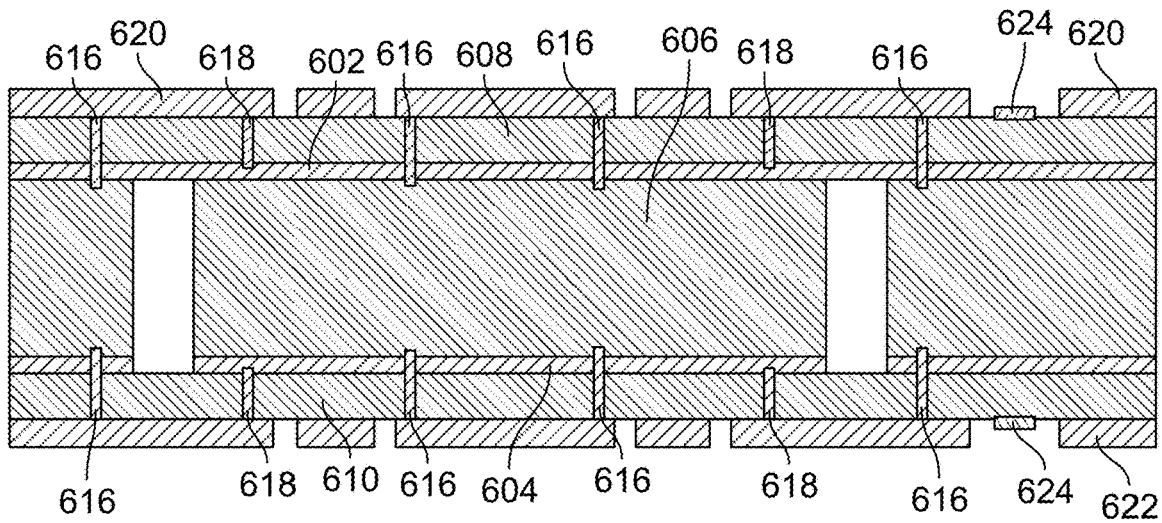
Figure 6K:
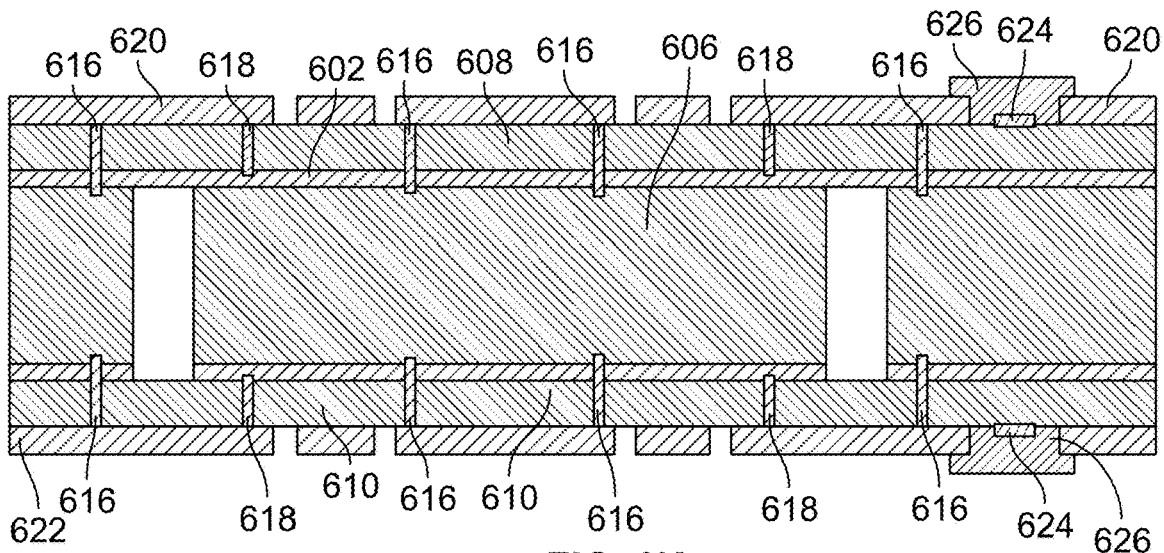
Figure 6L:
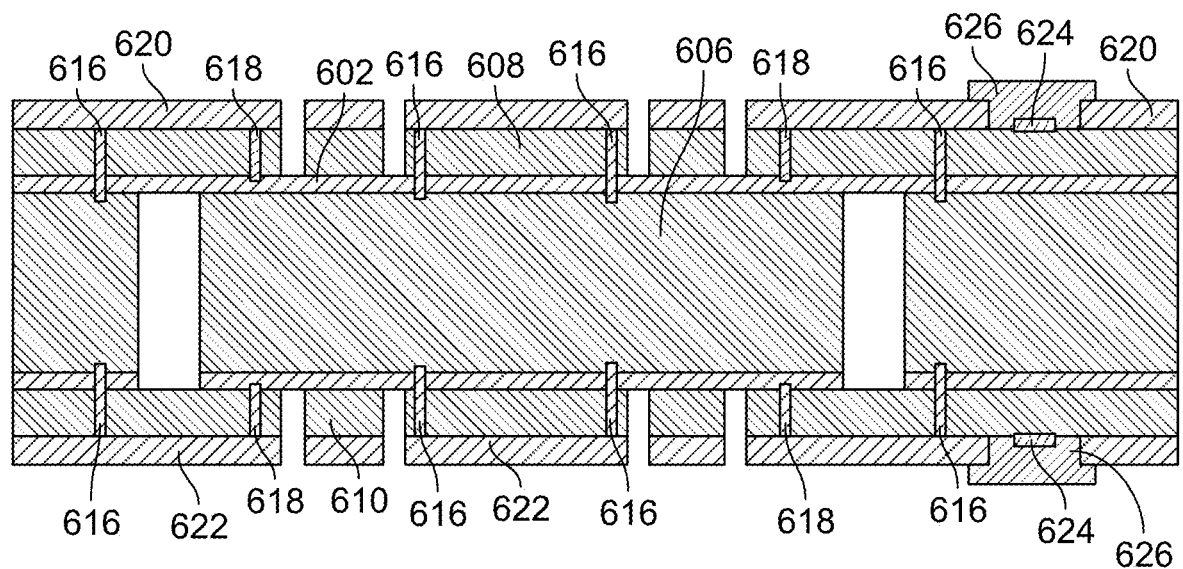

Next, as shown in FIG. 6J, a conductive layer 624 is deposited and patterned to create bond pads 207 for making electrical connections to proof mass 205. A protective photoresist layer 626 is patterned over bond pad conductive layer 624 in FIG. 6K and DRIE is used to etch through silicon layers 608, 610 on both the front and back side of device 200 in FIG. 6L.

Figure 6M:
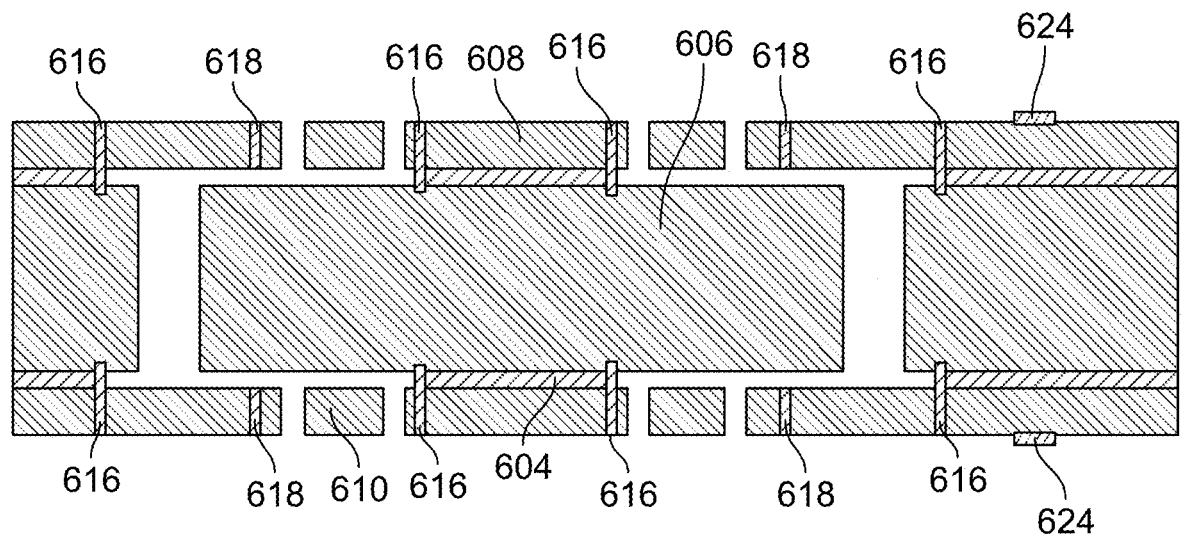

Finally, as shown in FIG. 6M, silicon dioxide layers 602 and 604 are etched using hydrofluoric acid, and the device is dried using supercritical carbon dioxide.

While illustrative systems and methods as described herein embodying various aspects of the present disclosure are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present invention.

What is claimed is:

1. An apparatus comprising:
   a frame;
   a proof mass situated within the frame;
   a plurality of flexures anchored to the frame at a first end of each of the plurality of flexures and connected to the proof mass at a second end of each of the plurality of flexures, wherein the plurality of flexures are configured to allow the proof mass to move along a z axis and restrict the proof mass from moving along other axes perpendicular to the z axis, wherein a first set of flexures are located above a first portion of the proof mass along the z axis and a second set of flexures are located below the first portion of the proof mass along the z axis; and
   a plurality of fixed electrodes, wherein a first set of fixed electrodes are located above a second portion of the proof mass along the z axis and a second set of fixed electrodes are located below the second portion of the proof mass along the z axis.

2. The apparatus of claim 1, wherein a top surface of the proof mass, a top surface of the first set of flexures, and a top surface of the first set of fixed electrodes are coplanar when the proof mass is in a predetermined location.

3. The apparatus of claim 1, further comprising: a plurality of bond pads configured to allow electrical contact to the proof mass, wherein the plurality of bond pads are connected to the proof mass through electrical interconnection routed through the plurality of flexures.

4. The apparatus of claim 1, wherein the proof mass is attached to a first set of four flexures on a top side of the apparatus along the z axis and a second set of four flexures on a bottom side of the apparatus along the z axis, the first set of four flexures is a bilateral set of flexures, the second set of four flexures is a bilateral set of flexures, and the first and second sets of four flexures each include at least one diametrically opposed pair of flexures.

5. The apparatus of claim 4, wherein the first set of four flexures on the top side of the apparatus along the z axis is arranged symmetrically with respect to the second set of four flexures on the bottom side of the apparatus along the z axis.

6. The apparatus of claim 1, wherein the apparatus comprises two micromachined silicon-on-insulator (SOI) wafers bonded together.

7. The apparatus of claim 1, wherein the apparatus comprises a silicon-on-insulator (SOI) wafer bonded to a silicon wafer.

8. The apparatus of claim 1, wherein the plurality of flexures and the proof mass are made from silicon.

9. The apparatus of claim 1, wherein the proof mass and the first set of fixed electrodes form a first set of capacitors,
   wherein the proof mass and the second set of fixed electrodes form a second set of capacitors, and
   wherein at least some of the plurality of fixed electrodes are configured to sense a change in differential capacitance between one of the first set of capacitors and one of the second set of capacitors as the proof mass moves in response to an external acceleration along the z axis.

10. The apparatus of claim 9, wherein one of the first set of fixed electrodes and one of the second set of fixed electrodes are further configured to drive the proof mass to a predetermined location in a cavity formed between the one of the first set of fixed electrodes and the one of the second set of fixed electrodes upon application of a first voltage to the one of the first set of fixed electrodes and a second voltage to the one of the second set of fixed electrodes.

11. The apparatus of claim 10, wherein the predetermined location is halfway between the one of the first set of fixed electrodes and the one of the second set of fixed electrodes.

12. The apparatus of claim 10, wherein at least some of the plurality of fixed electrodes are configured to sense a displacement in the proof mass from the predetermined location.

13. The apparatus of claim 12, further comprising: a feedback control system configured to adjust the first voltage and the second voltage in order to move the proof mass back to the predetermined location.

14. An apparatus comprising:
a proof mass;
a first set of flexures on a top side of the apparatus; and
a second set of flexures on a bottom side of the apparatus,
wherein the first set of flexures is a bilateral set of flexures, the second set of flexures is a bilateral set of flexures, and the first and second sets of flexures each include at least one diametrically opposed pair of flexures,
wherein the first set of flexures is arranged symmetrically with respect to the second set of flexures,
wherein the first and second sets of flexures are configured to allow the proof mass to move along a first axis and restrict motion of the proof mass along second and third axes perpendicular to the first axis, and
wherein a portion of the proof mass juts out along at least one of the second and third axes between opposing ones of the first set of flexures and the second set of flexures.

15. The apparatus of claim 14, further comprising: a plurality of electrodes, of which a first set of electrodes are located above the proof mass and a second set of electrodes are located below the proof mass.

16. The apparatus of claim 15, further comprising: a voltage source configured to apply a voltage to at least some of the plurality of electrodes.

17. The apparatus of claim 15, further comprising: an amplifier configured to amplify a signal measured at the plurality of electrodes.

18. A microelectromechanical accelerometer for sensing acceleration along a z axis, comprising:
a frame;
a proof mass;
a first set of flexures on a top side of the microelectromechanical accelerometer;
a second set of flexures on a bottom side of the microelectromechanical accelerometer; and
a plurality of electrodes,
wherein the first set of flexures is a bilateral set of flexures, the second set of flexures is a bilateral set of flexures, and the first and second sets of flexures each include at least one diametrically opposed pair of flexures,
wherein the first set of flexures is arranged symmetrically with respect to the second set of flexures,
wherein each flexure is anchored to the frame at a first end of each flexure and connected to the proof mass at a second end of each flexure,
wherein a first portion of the proof mass juts out in a plane orthogonal to the z axis between opposing ones of the first set of flexures and the second set of flexures,
wherein a second portion of the proof mass juts out in the plane orthogonal to the z axis between opposing electrodes of the plurality of electrodes,
wherein the proof mass is displaced along the z axis in response to at least one of a voltage applied between the opposing electrodes and a first external acceleration along the z axis, and
wherein the first and second sets of flexures are arranged such that a second external acceleration in the plane orthogonal to the z axis places at least some of the flexures in tension and at least some others of the flexures in compression.

19. The microelectromechanical accelerometer of claim 18, wherein the first and second sets of flexures are configured to suppress rotational motion of the proof mass.

20. The microelectromechanical accelerometer of claim 18, wherein the frame, the proof mass, and the first and second sets of flexures are made out of silicon.

* * * * *